United States Patent
Lin et al.

(10) Patent No.: US 9,960,664 B2
(45) Date of Patent: May 1, 2018

(54) VOLTAGE CONVERTER

(71) Applicant: Alpha and Omega Semiconductor (Cayman) Ltd., Sunnyvale, CA (US)

(72) Inventors: Tien-Chi Lin, New Taipei (TW); Yu-Ming Chen, Hsinchu (TW); Jung-Pei Cheng, Zhubei (TW); Yung-Chuan Hsu, Zhubei (TW); Yueh-Ping Yu, Zhubei (TW); Wei-Ting Wang, Zhudong Township (TW); Pei-Lun Huang, Zhubei (TW)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 0 days. days.

(21) Appl. No.: 15/240,787

(22) Filed: Aug. 18, 2016

(65) Prior Publication Data

US 2016/0359419 A1    Dec. 8, 2016

Related U.S. Application Data

(63) Continuation-in-part of application No. 14/562,727, filed on Dec. 7, 2014, now abandoned, and a continuation-in-part of application No. 14/562,729, filed on Dec. 7, 2014, and a continuation-in-part of application No. 14/562,731, filed on Dec. 7, 2014, (Continued)

(30) Foreign Application Priority Data

Sep. 11, 2015   (CN) .......................... 2015 1 0579436

(51) Int. Cl.
*H02M 3/335*   (2006.01)
*H02M 1/08*    (2006.01)
*H02M 1/40*    (2007.01)
*H02M 1/00*    (2006.01)
*H02M 1/36*    (2007.01)

(52) U.S. Cl.
CPC ............... *H02M 1/08* (2013.01); *H02M 1/40* (2013.01); *H02M 3/33523* (2013.01); *H02M 3/33592* (2013.01); *H02M 1/36* (2013.01); *H02M 2001/0006* (2013.01); *H02M 2001/0009* (2013.01); *Y02B 70/1475* (2013.01)

(58) Field of Classification Search
CPC ......... H02M 3/33592; H02M 3/33523; H02M 1/40; Y02B 70/1475
USPC ..... 363/20, 21, 21.12–21.18, 49, 78–81, 84, 363/89
See application file for complete search history.

(56) References Cited

U.S. PATENT DOCUMENTS 5,321,596 A * 6/1994 Hurst .................. H02M 7/4807
                                              363/127
5,644,481 A * 7/1997 Konishi ............ H02M 3/33523
                                              363/21.15

(Continued)

*Primary Examiner* — Rajnikant Patel
(74) *Attorney, Agent, or Firm* — Lance A. Li; Chein-Hwa Tsao; 5Suns

(57) ABSTRACT

A voltage converter comprises a second controller as a power switch of the secondary side of the transformer for comparing a detection voltage representing an output voltage and/or load current with a first reference voltage and generating a control signal, and a coupling element for transmitting the control signal generated by the second controller to the first controller on the primary side of the transformer enabling the first controller to generate a first pulse signal driving the power switch to control the on/off state of the primary side winding.

15 Claims, 23 Drawing Sheets

Related U.S. Application Data now Pat. No. 9,577,542, and a continuation-in-part of application No. 14/562,733, filed on Dec. 7, 2014, now Pat. No. 9,548,667, and a continuation-in-part of application No. 14/562,735, filed on Dec. 7, 2014, now Pat. No. 9,577,543.

(56) References Cited

U.S. PATENT DOCUMENTS

| | | | |
|---|---|---|---|
| 6,208,531 B1* | 3/2001 | Vinciarelli | H01F 38/14 363/21.07 |
| 7,023,717 B2* | 4/2006 | Nakagawa | H02M 3/33523 323/349 |
| 8,218,340 B2* | 7/2012 | Sato | H02M 1/08 323/303 |

* cited by examiner

VOLTAGE CONVERTER

CROSS-REFERENCE TO RELATED APPLICATIONS

This application claims the priority benefit of Chinese patent application number 201510579436.5 filed Sep. 11, 2015 by a common inventor of this Application. The entire Disclosure made in the Chinese patent application number 201510579436.5 is hereby incorporated by reference.

This application is a Continuation-In-Part (CIP) application of a pending U.S. patent application Ser. No. 14/562,727 filed on Dec. 7, 2014. The entire disclosure made in U.S. patent application Ser. No. 14/562,727 is hereby incorporated by reference.

This application is a Continuation-In-Part (CIP) application of a pending U.S. patent application Ser. No. 14/562,729 filed on Dec. 7, 2014. The entire disclosure made in U.S. patent application Ser. No. 14/562,729 is hereby incorporated by reference.

This application is a Continuation-In-Part (CIP) application of a pending U.S. patent application Ser. No. 14/562,731 filed on Dec. 7, 2014. The entire disclosure made in U.S. patent application Ser. No. 14/562,731 is hereby incorporated by reference.

This application is a Continuation-In-Part (CIP) application of a pending U.S. patent application Ser. No. 14/562,733 filed on Dec. 7, 2014. The entire disclosure made in U.S. patent application Ser. No. 14/562,733 is hereby incorporated by reference.

This application is a Continuation-In-Part (CIP) application of a pending U.S. patent application Ser. No. 14/562,735 filed on Dec. 7, 2014. The entire disclosure made in U.S. patent application Ser. No. 14/562,735 is hereby incorporated by reference.

FIELD OF THE INVENTION

The invention mainly relates to an electronic device for voltage conversion, and in particular relates to a power supply device, which is used for sensing an output voltage or output current of secondary windings of a transformer for power conversion in real time so as to generate control signals with transient response and transmitting the control signals to primary windings of the transformer for power conversion by using coupling elements to control the primary windings to be turned off or turned on.

BACKGROUND OF THE INVENTION

In a voltage converter, such as a pulse width modulation mode or pulse frequency modulation mode converter, the voltage or the current of a load is acquired and a feedback signal representing the voltage or the current of the load is fed back to a driving component of the voltage converter via a feedback network. The duty ratio of a master switch, which is turned on and off in the voltage converter, is determined through the driving component according to the feedback signal, so that the output voltage of the voltage converter at the load can be measured. It is known to a person having ordinary skill in the art that the driving component of the voltage converter is used for driving the master switch. However, the load voltage, which varies with time, cannot be directly acquired from the load; the load voltage is instead sensed through the feedback network, which delays the load voltage measurement and thereby preventing synchronization of the driving component and the change state of the load voltage to switch the master switch in real time generating a difference between a present output voltage outputted to the load and a practical voltage requested by the load, and thus causing a potential instability for the output voltage.

BRIEF DESCRIPTION OF THE DRAWINGS

The characteristics and advantages of the invention will be apparent after reading the following detailed descriptions and referring to the following drawings.

DETAILED DESCRIPTION OF THE EMBODIMENTS

With the combination of the embodiments, the technical scheme of the invention is clearly and completely illustrated, the described embodiments are only embodiments for describing the invention but not all embodiments, based on the embodiments, schemes obtained by technicians of the field without creative work all belong to the protection scope of the invention.

Figure 1:
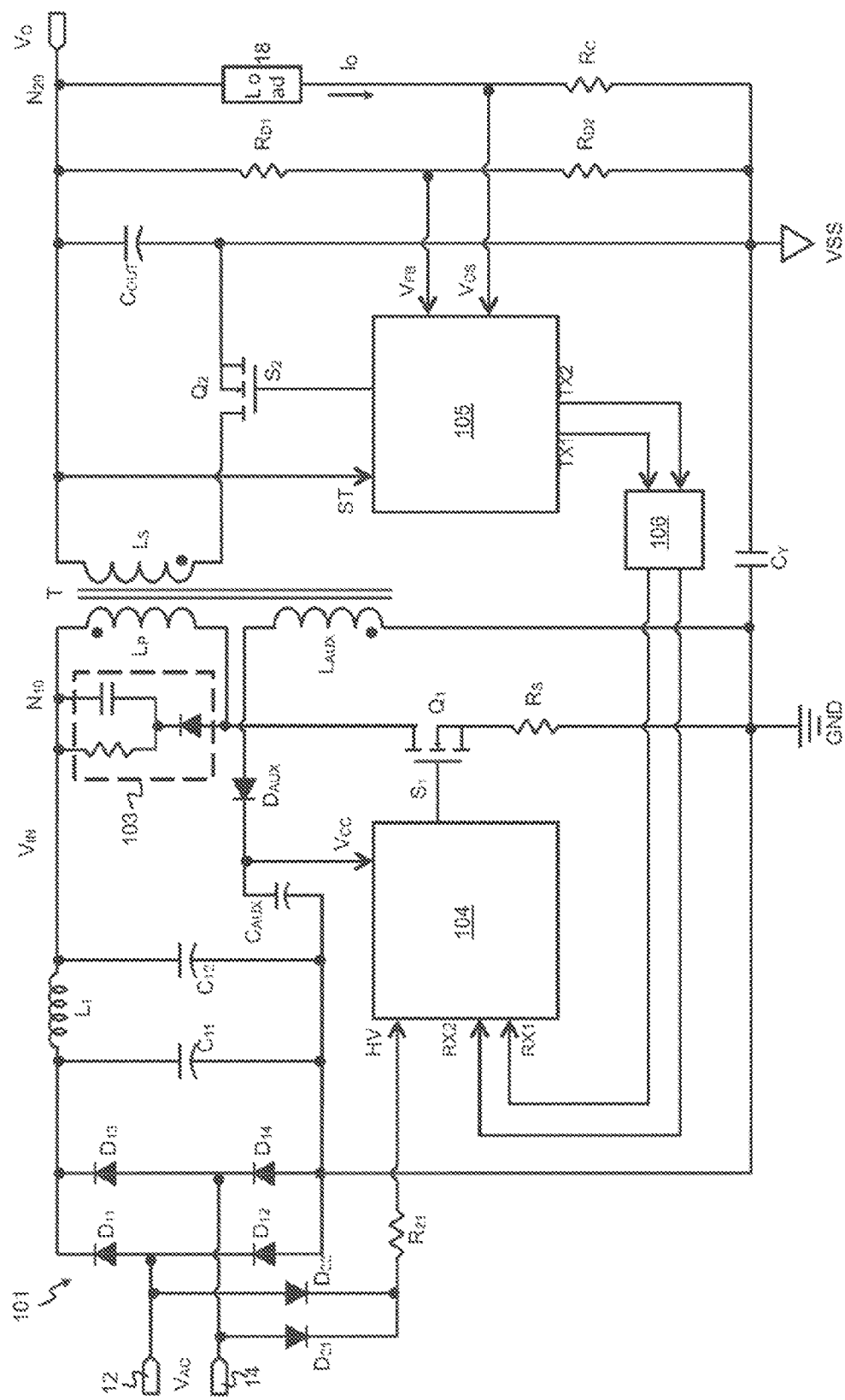
FIG. 1 is a circuit diagram of a standard voltage converter.

As shown in FIG. 1, an AC/DC FLYBACK voltage converter includes a power transformer T for voltage conversion mainly including primary windings $L_P$ and secondary windings $L_S$, where the first end of the primary winding $L_P$ is used for receiving an input voltage $V_{IN}$ at an input node $N_{10}$, and a master switch Q1 is connected between a second end of the primary winding $L_P$ and a ground terminal GND. The basic working mechanism is that the master switch Q1 is driven to be turned on and turned off through a primary winding controller, which is also referred to as a first controller 104. When the master switch Q1 is turned on, the current of the primary windings flows through the primary windings $L_P$ and the master switch Q1 and to the ground terminal GND, therefore no current flows through the secondary windings $L_S$ in this period, and thus the primary windings $L_P$ start to store energy. Once the master switch Q1 is turned off, the current of the primary windings $L_P$ is stopped, thus the polarities of all windings are reversed, and the transformer T starts to transfer the energy to the secondary windings $L_S$, so that the secondary windings $L_S$ are enabled to provide the working voltage and current to the load 18 while the master switch Q1 is turned off. An output capacitor $C_{OUT}$ is charged at the output node $N_{20}$, and the working voltage can be continuously provided to the load 18 through the output capacitor $C_{OUT}$ when the working current cannot be directly provided to the load 18 as no current flows through the secondary windings $L_S$. In some embodiments, the transformer T further comprises an auxiliary winding $L_{AUX}$, where the coils of the auxiliary winding $L_{AUX}$ are wound in a direction same as those of the secondary windings $L_S$, once the master switch Q1 is turned off, the current flowing through the auxiliary winding $L_{AUX}$ can be used for charging a capacitor $C_{AUX}$ and can be taken as a working voltage source of a first controller 104.

The alternating current is firstly rectified by using a bridge rectifier 101 comprising four diodes D11 to D14. Generally, a sinusoidal alternating current voltage $V_{AC}$ is inputted into a pair of input lines, for example buses 12 and 14, and the bridge rectifier 101 makes full use of the positive semi-cycle and the negative semi-cycle of the sinusoidal waveforms of an original alternating current to convert complete sinusoidal waveforms of the alternating current of same polarity to output. After full-wave rectification of the bridge rectifier 101, alternating current $V_{AC}$ is converted into a pulsating voltage with the alternating current. For further reducing the waves of the pulsating voltage, a CLC filter $L_1$ $C_{11}$ $C_{12}$ is adopted to filter out the waves of the rectified voltage so as to obtain an input voltage $V_{IN}$ after the alternating current is rectified. As shown in FIG. 1, a first end of an inductor $L_1$ of the CLC filter is connected with the cathodes of diodes $D_{11}$ and $D_{13}$ of the rectifier 101, while a second end of the inductor $L_1$ is coupled to the first end of the primary winding $L_P$ at a node $N_{10}$. Capacitor $C_{11}$ of the CLC filter is connected between the first end of the inductor $L_1$ and the ground terminal GND while another capacitor $C_{12}$ of the CLC filter is connected between the second end of the inductor $L_1$ and the ground terminal GND. The anodes of the diodes $D_{12}$ and $D_{14}$ of the bridge rectifier are both connected to the ground terminal GND, while the bus 12 is connected with the anode of the diode $D_{11}$ and the cathode of the diode $D_{12}$, and the bus 14 is connected with the anode of the diode $D_{13}$ and the cathode of the diode $D_{14}$.

The voltage converter further comprises an RCD clamping circuit or a turn-off buffer circuit 103 which is connected in parallel with the primary windings $L_P$. The turn-off buffer circuit 103 comprises a capacitor and a resistor, which are connected in parallel with each other and mutually connected with the node $N_{10}$ at one end of the capacitor and the resistor, and connected to the cathode of a diode in the turn-off buffer circuit 103 at the other end. The anode of the diode is connected with the second end of the primary windings $L_P$. The turn-off buffer circuit 103 limits the overlap of a peak voltage and a primary coil reflection voltage caused by energy of high-frequency value converter leakage inductance when the master switch Q1 is turned off. Typically, an overlap voltage may be generated when the master switch Q1 is turned off from a saturated state; thus the energy of leakage inductance can be adopted to charge the capacitor through the diode of the turn-off buffer circuit 103. The voltage of the capacitor can be increased to the overlap value of counter electromotive force and the leakage inductance voltage, and the capacitor has the function of absorbing the energy. When the primary windings $L_P$ and the master switch Q1 enter into the turn-on period from the turn-off state, the energy of the capacitor of the turn-off buffer circuit 103 is released through the resistor of the turn-off buffer circuit 103 until the voltage of the capacitor meets the counter electromotive force before the master switch Q1 is turned off at the latter time.

The first end of the secondary winding $L_S$ is connected with the output node $N_{20}$, the second end of the secondary winding $L_S$ is connected with the first end of the synchronous switch Q2, and the second end of the synchronous switch Q2 is connected with the reference ground potential VSS. An output capacitor $C_{OUT}$ is connected between the output node $N_{20}$ and a reference ground potential VSS, an output voltage $V_O$, or the working voltage of load 18, can be provided to the load 18 at the output node $N_{20}$. It is required that if one of the two switches Q1 and Q2 is turned on, the other one needs to be turned off. For example, the synchronous switch Q2 of the secondary winding is turned off if the master switch Q1 of the primary winding is turned on; vice versa, the synchronous switch Q2 of the secondary winding is turned on if the master switch Q1 of the primary winding is turned off. The master switch Q1 and the synchronous switch Q2 are respectively provided with a first end, a second end and a control end; whether the first ends and the second ends of the switches are in communication is determined according to logic state (i.e., high or low) of the signals applied to the control ends. In the normal working period of the voltage converter, a first pulse signal $S_1$ generated by the first controller 104 of the primary winding is adapted to drive the master switch Q1, by turning it off and on. A second pulse signal $S_2$ generated by a second controller 105 of the secondary winding is adapted to drive the synchronous switch Q2, by turning it off and on. In addition, when the synchronous switch Q2 is driven by the second pulse signal $S_2$ generated by the second controller 105, a dead time between the master switch Q1 and the synchronous switch Q2 can be generated causing that the synchronous switch Q2 is turned off under the control of the second pulse signal $S_2$ while the master switch Q1 is also turned off under the control of the first pulse signal $S_1$.

In addition to the secondary windings $L_S$, the first end of the auxiliary winding $L_{AUX}$ is connected with the anode of a diode $D_{AUX}$, while the cathode of the diode $D_{AUX}$ is connected with a first end of the capacitor $C_{AUX}$. The second end of the auxiliary winding $L_{AUX}$ and the second end of the capacitor $C_{AUX}$ is connected with the ground terminal GND.

When the master switch Q1 is turned on, the first ends of the secondary windings $L_S$ and the auxiliary winding $L_{AUX}$ are negative relative to their second ends and have no current flowing through the windings; the load 18 is supplied with power of the output capacitor $C_{OUT}$. Conversely, when the master switch Q1 is turned off, the secondary windings $L_S$ and the auxiliary winding $L_{AUX}$ are of opposite polarities; the respective first ends are positive relative to the second ends and both have current flowing through the windings. Thus, the energy from the primary windings $L_P$ is transferred to the secondary windings $L_S$ and the auxiliary winding $L_{AUX}$. In other words, when the master switch Q1 is turned off, the secondary windings $L_S$ not only provide current to the load 18, but also charge the output capacitor $C_{OUT}$, and the auxiliary winding $L_{AUX}$ also charges the auxiliary capacitor $C_{AUX}$ as a power supply. As shown in FIG. 1, the voltage $V_{CC}$ held at one end of the auxiliary capacitor $C_{AUX}$ is the power supply voltage of the first controller 104. A safety capacitor $C_Y$, which is connected between the ground terminals GND of the primary windings and the reference ground potentials VSS of the secondary windings, by which the noise voltage generated by the capacitor between the primary windings and the secondary windings may be filtered out, or common mode interference caused by a coupling capacitor between the primary windings and the secondary windings can be filtered out.

The second controller 105 of the secondary winding is adapted to capture the change of the output voltage $V_O$ at the node $N_{20}$ in real time, or sense the change of the load current $I_O$ (i.e. output current) flowing through the load 18 in real time, and thus a control signal SQ is generated. A first pulse signal S1 can be further generated by the first controller 104 of the primary winding according to the high/low logic states of the control signal SQ, and thus whether the master switch Q1 needs to be turned on or turned off can be determined according to the first pulse signal S1. As the control signal SQ generated by the second controller 105 changes nearly in a temporary state response manner relative to the voltage $V_O$ or current $I_O$, the first pulse signal S1 generated by the first controller 104 can respond to the change of the control signal SQ in real time. Equivalently, the first pulse signal S1 tracks the change of the voltage $V_O$ or current $I_O$ in real time. The detail of how control signal SQ is generated by the second controller 105 and how the information is transmitted between the second controller 105 and the first controller 104 through the coupling element is described in detail below.

Figure 2:
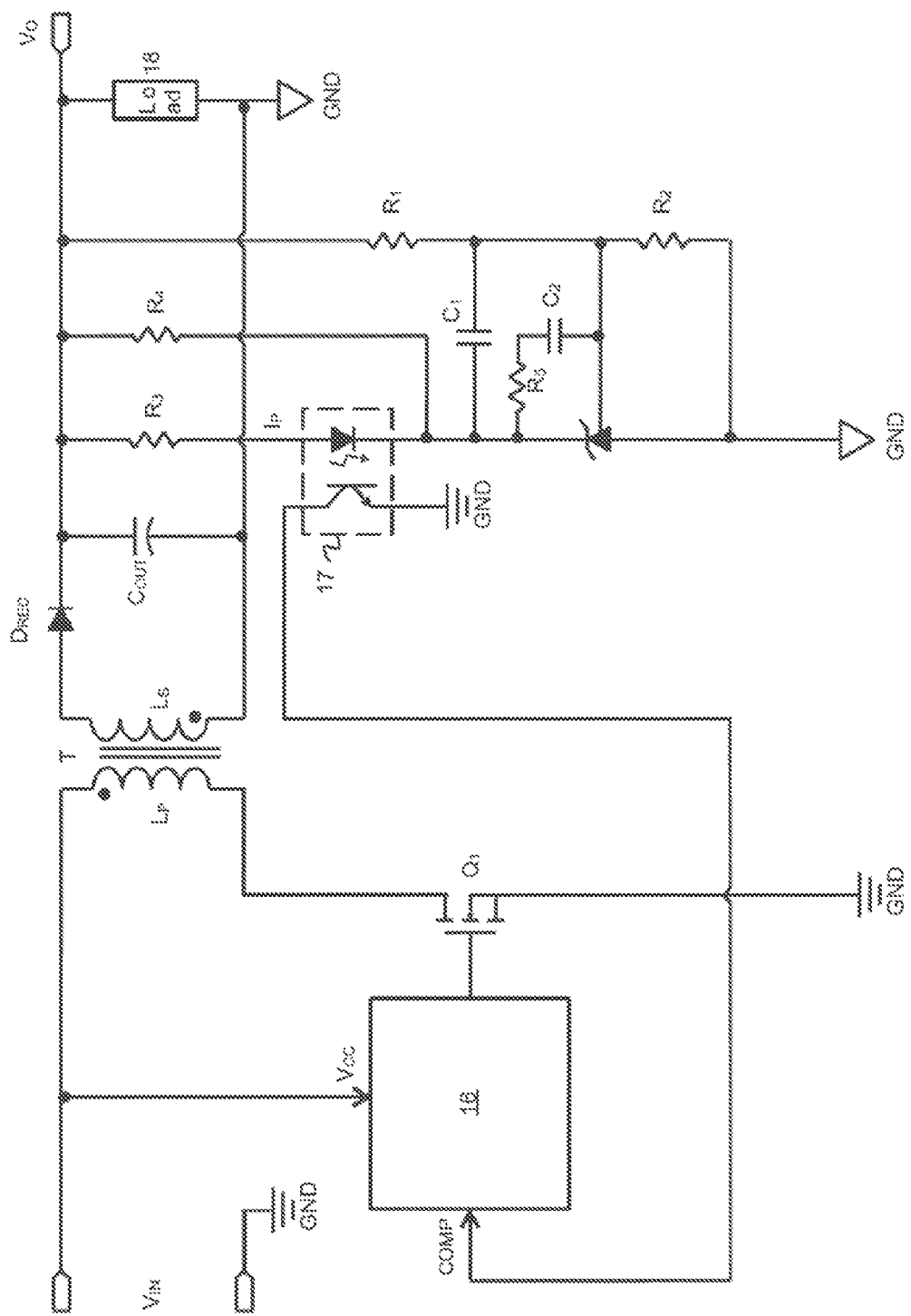
FIG. 2 is a circuit diagram of a conventional feedback network for the voltage converter.

As shown in FIG. 2, a conventional feedback network includes a resistor $R_1$ and a resistor $R_2$ adapted for partial voltage sampling on the output voltage $V_O$; a resistor $R_3$ adapted for loop gain adjustment; and compensation capacitors $C_1$ and $C_2$, and a compensation resistor $R_5$ adapted for compensation. The general working principle of the feedback network is that when the output voltage $V_O$ is increased, the partial voltages of the resistors $R_1$ and $R_2$ are inputted into a control end (i.e., an input end of a voltage error amplifier) of a three-end programmable in-parallel voltage stabilizing diode in the feedback network, so that the voltage of the control end is increased along with increase of the output voltage $V_O$. As the voltage of the cathode (i.e. an output end of the voltage error amplifier) of the three-end programmable in-parallel voltage stabilizing diode drops, a primary side current $I_P$, which flows through a light emitting element connected between the cathode of the three-end programmable in-parallel voltage stabilizing diode and the resistor $R_3$ in an optical coupler 17, is increased; an output current flowing through a transistor for receiving light intensity on another side of the optical coupler 17 is also increased. When the voltage of a feedback port COMP of a primary winding controller 16 is reduced, the duty ratio of the pulse signal for controlling the master switch Q1 is also reduced, and consequently the output voltage $V_O$ is also reduced. Conversely, when the output voltage $V_O$ is reduced, the adjustment process is similar but in opposite tendency—increase in the duty ratio of the pulse signal for controlling the master switch Q1 also causes the voltage $V_O$ to increase. The resistor R4 provides additional currents into the feedback network to prevent it from operating abnormally when the current is too small. The resistor $R_4$ can be omitted if the resistor R3 has an appropriate resistance. The feedback network shown in FIG. 2 requires sufficient gain and phase margin to ensure the stability of the whole system. For example, the open loop gain at least needs a phase margin of 45 degrees, and generally, the phase margins ranges from 45 degrees to 75 degrees. However, in the conventional feedback network of FIG. 2, the control mode is complex and the delay effect is conspicuous, as such the situation of the secondary winding cannot be detected by the primary winding controller 16 in real time.

Figure 3:
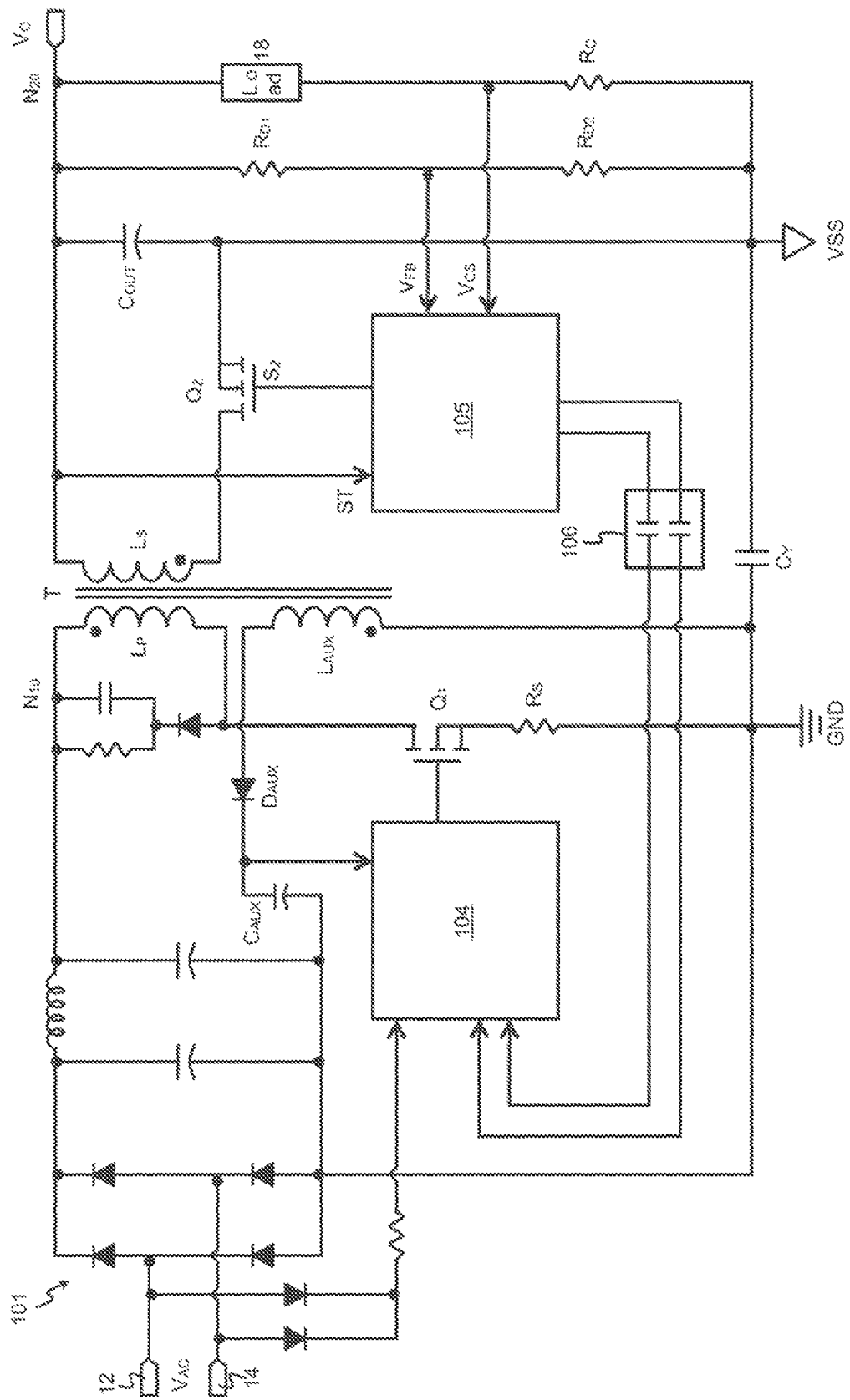
FIG. 3 and FIG. 4 are the circuit diagrams of voltage converters with the coupling elements including capacitors or pulse transformers respectively.
Figure 4:
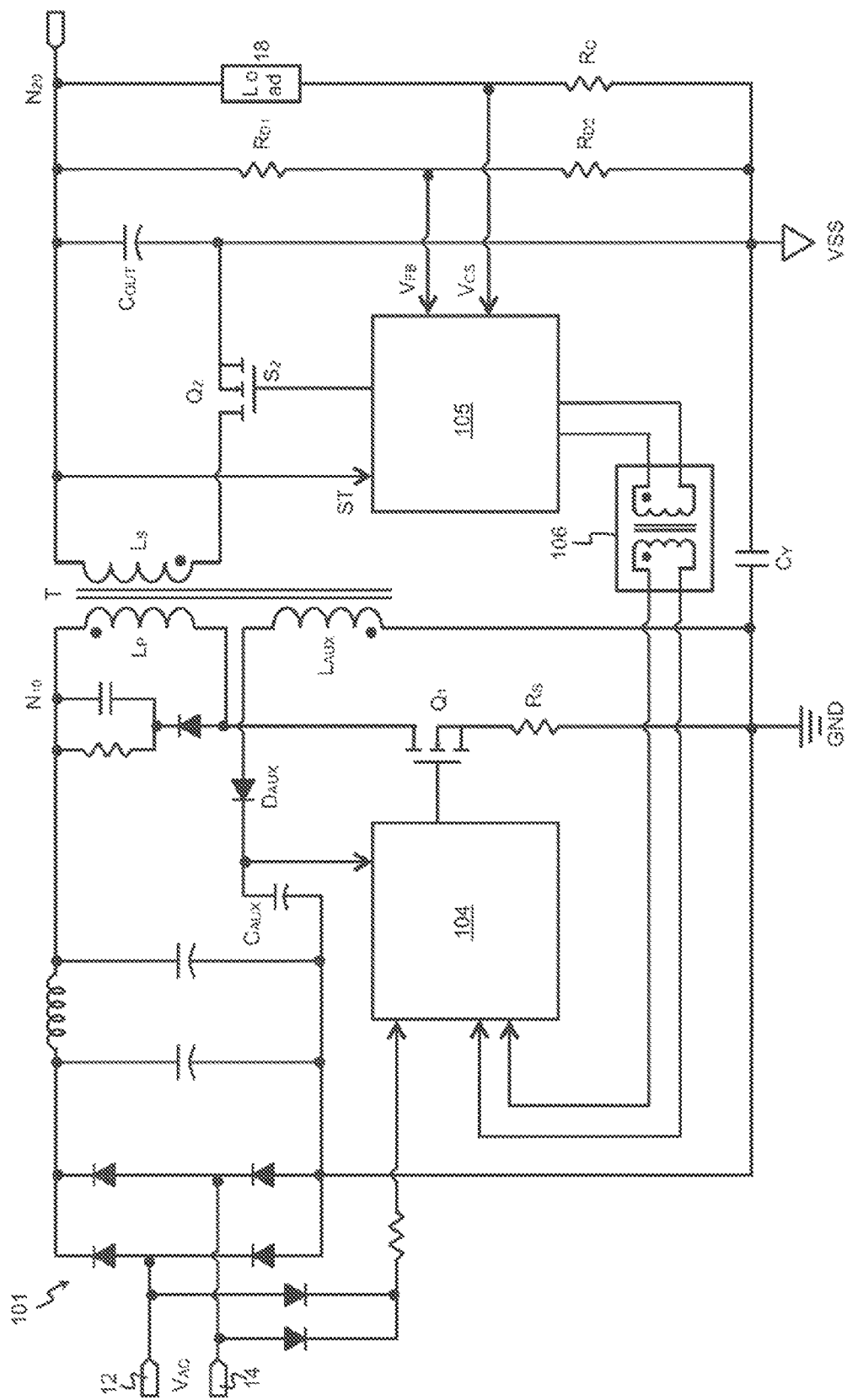

As shown in FIG. 3, the coupling element 106 of the voltage converter shown in FIG. 1 includes a coupling capacitor. Alternatively, as shown in FIG. 4, the coupling element 106 of the voltage converter shown in FIG. 1 includes a pulse transformer. In addition, the coupling element 106 can include other dielectric elements or optical coupling elements as long as data information can be interacted between the primary winding controller that is also called as the first controller 104 and the secondary winding controller that is also called as the second controller 105.

Figure 5:
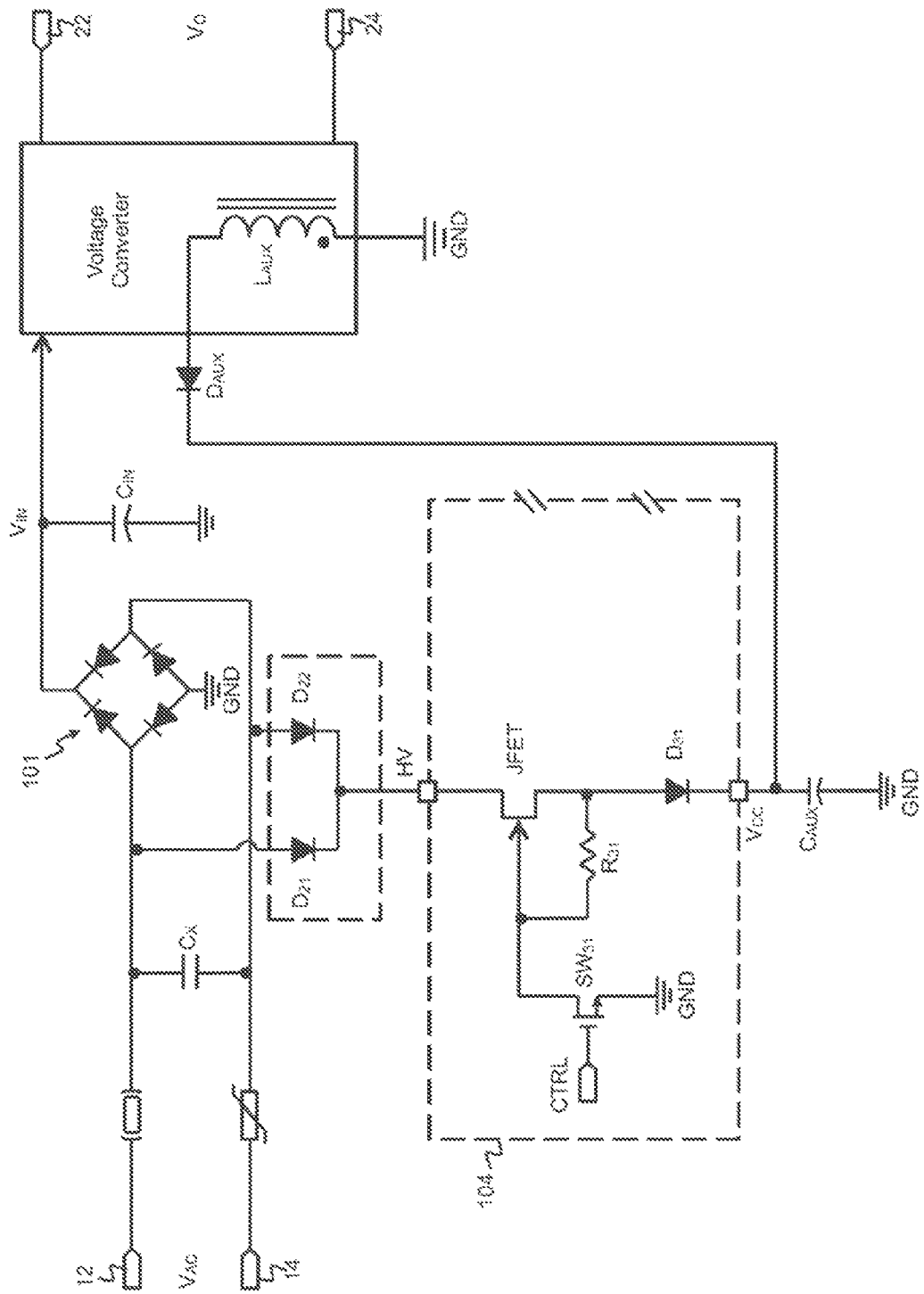
FIG. 5 is a circuit diagram of a starting module equipped in a first drive on the primary winding of the voltage converter.

As shown in FIG. 5, a safety capacitor $C_X$, which is used for suppressing different model interference and filtering out high-frequency clutter signals, is connected between the input lines 12 and 14, and one input capacitor $C_{IN}$ is connected between the input node and the ground terminal GND. The alternating current voltage $V_{AC}$ inputted into the input lines 12 and 14 is rectified by the bridge rectifier 101 and is subsequently filtered by the input capacitor $C_{IN}$, so as to obtain the input voltage $V_{IN}$. The voltage converter converts the input voltage $V_{IN}$ to provide the output voltage $V_O$ to the load through output lines 22 and 24. In this embodiment, the device of the invention further comprises a rectifier circuit connected with the input lines 12 and 14. The rectifier circuit includes a rectifying diode $D_{21}$ having the anode connected with the input line 12 and another rectifying diode $D_{22}$ having the anode connected with the input line 14; the cathodes of the diodes $D_{21}$ and $D_{22}$ are both connected with the drain of a high-voltage starting element JFET (junction field effect transistor) of the first controller 104. The limiting resistor $R_{21}$ shown in FIG. 1 may also be connected between the drain of JFET and the cathodes of the diodes $D_{21}$ and $D_{22}$. The source of JFET is connected with the anode of a diode $D_{31}$, and the cathode of the diode $D_{31}$ is connected with one end of the auxiliary capacitor $C_{AUX}$, which is connected with the ground and used as the power supply. A limiting resistor $R_{31}$ is connected between a gate control end and the source of the JFET. A control switch $SW_{31}$ is connected between the gate of the JFET and the ground terminal GND. The first end of the control switch $SW_{31}$ is connected with the gate of the JFET, and the second end of the control switch $SW_{31}$ is connected with the ground terminal GND. When the input lines 12 and 14 are supplied with the alternating currents, an on-off signal CTRL applied to the gate of the control switch $SW_{31}$ starts to drive the control switch $SW_{31}$ to enter into a turn-on state. The gate of the control switch $SW_{31}$ can be connected with the ground potential GND to communicate with JFET of a negative critical voltage, so that the generated current flows from the drain to the source to charge one end not connected with the ground of the capacitor $C_{AUX}$ through the diode $D_{31}$. Forward voltage drop across resistor $R_{31}$ is increased, but the voltage between the gate and the source is decreased, so that the voltage between the source and the gate of the JFET is approximately balanced with a voltage of Pinch-off of the JFET. Specifically, the actual voltage drop from the gate G to the source S of the JFET is equal to a negative value of the Pinch-off voltage. When the capacitor $C_{AUX}$ is charged by the JFET until the stored voltage $V_{CC}$ is increased to meet a starting voltage, a driving control module (not shown), which is adapted to generate an initial pulse signal, may be triggered to enter into a working state. The master switch Q1 is driven by the initial pulse signal to be turned on or off. The above steps complete the Start-Up procedure for the voltage converter. After the Start-Up procedure is completed, the capacitor $C_{AUX}$ is charged through the diode $D_{AUX}$ by using an auxiliary winding $L_{AUX}$. In addition, a voltage divider can be used to connect between the first end of the auxiliary winding $L_{AUX}$ and the ground terminal GND. The partial voltage sampled by the voltage divider can be inputted into the first controller 104, so that zero current passage (ZCD) detection on the secondary windings or over-voltage detection on the output voltages of the secondary windings can be achieved by using the voltage divider through the first controller 104 (not shown). As shown in FIG. 1, the first end of the master switch Q1 (i.e., the drain) is connected with the second end of each primary winding $L_P$, a sensing resistor $R_S$ is further connected between the second end, which is the source of the master switch Q1, and the ground terminal GND, thus the voltage Vs of the current flowing through the primary windings can be obtained by multiplying the current flowing through the primary windings $L_P$ with the resistance of the sensing resistor $R_S$, and if the voltage $V_S$ is inputted into the first controller 104 and is defined during a preset limiting voltage $V_{LIMIT}$ by the first controller 104, the currents of the primary windings can be monitored, and over-current protection can be achieved.

As shown in FIG. 1, after the starting procedure is complete and the master switch Q1 is toggled for the first time, the voltage captured at the first end of the secondary winding $L_S$ is used as the starting voltage ST to start the second controller 105 of the secondary winding. The second controller 105 is adapted to monitor the output voltage $V_O$ of the secondary winding and the current $I_O$ flowing through the load 18 in real time. Specifically, a partial voltage $V_{FB}$ representing the output voltage $V_O$ is captured by the voltage divider comprising a pair of serially connected resistors $R_{D1}$ and $R_{D2}$ between the output node $N_{20}$ and the reference ground potential VSS of the secondary winding. Specifically, $V_{FB}$ is measured at a joint node of the resistor $R_{D1}$ and the resistor $R_{D2}$. $V_{FB}$ is then used as a feedback voltage and inputted into the second controller 105. The load 18 and a sensing resistor $R_C$ are serially connected and arranged between the output node $N_{20}$ and the reference ground potential VSS of the secondary winding. The value of the current $I_O$ flowing through the load 18 obtained by dividing the sensing voltage drop $V_{CS}$ of the sensing resistor $R_C$ by the resistance of the sensing resistor $R_C$. In other words, the sensing voltage drop $V_{CS}$ can be used to represent the loading current flowing through the load 18 and the sensing resistor $R_C$.

Figure 6A:
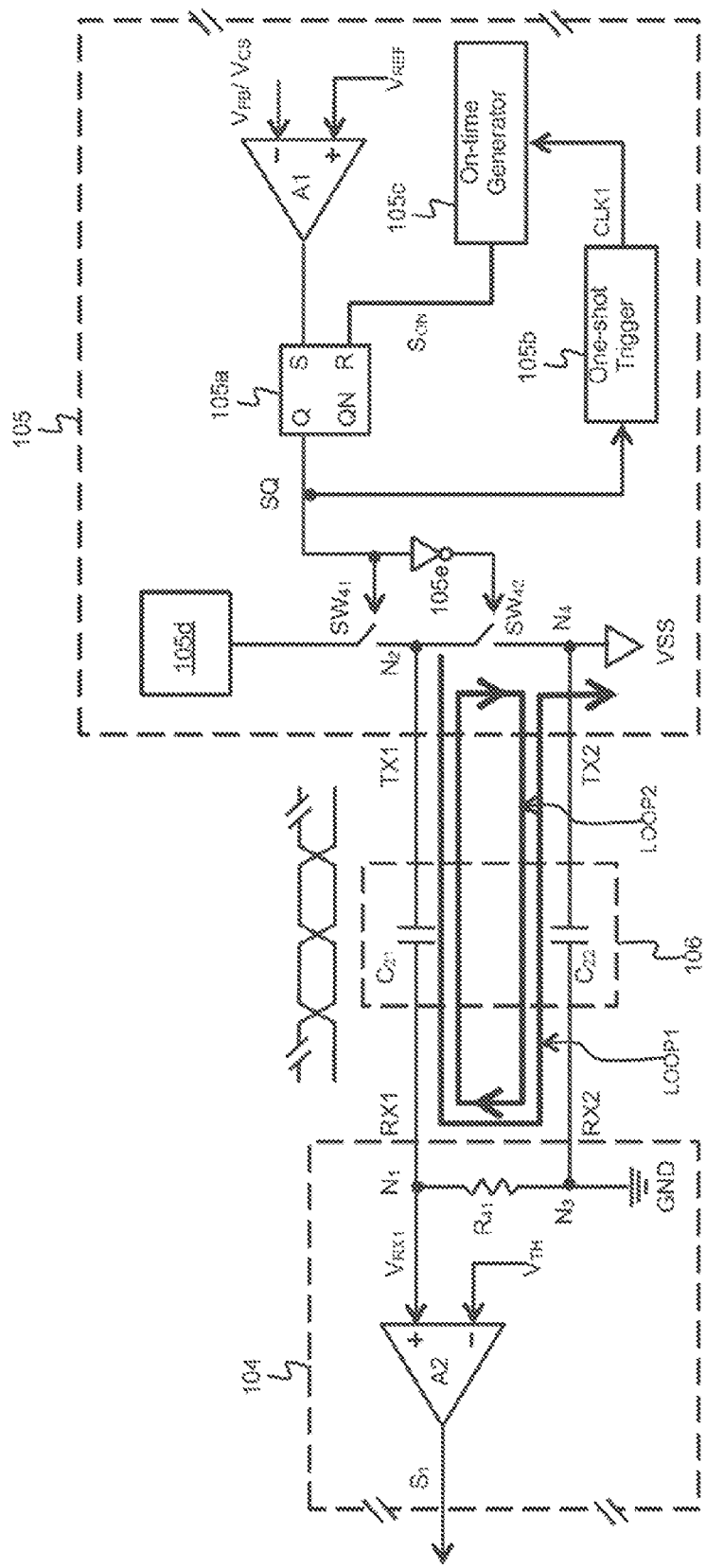
FIG. 6A is a circuit diagram showing the mode that a control signal is transmitted to the first drive from a second controller of the secondary winding by using a capacitance coupling element.

FIG. 6A illustrates the components of the first controller 104 and the second controller 105 used for controlling the turn on/turn off of the master switch Q1 in real time according to the change of the sensing voltage drop $V_{CS}$ and the feedback voltage $V_{FB}$ mentioned above. Data interaction of the first controller 104 and the second controller 105 is implemented through the coupling element 106, which comprises two coupling capacitors $C_{21}$ and $C_{22}$. The working mechanisms of the first controller 104 and the second controller 105 are described in detail below. The structures of the first controller 104 and the second controller 105 shown in FIG. 6A are only an example according to an embodiment of the present invention, thus other equivalent transformation modes and schemes obtained on the basis of this embodiment also belong to the protection scope of the invention.

The second controller 105 comprises a first switch $SW_{41}$ and a second switch $SW_{42}$, each of which includes a first end, a second end and a control end. Whether the first end and the second end are in communication is determined according to the high/low logic states of signals applied by the control ends. The first switch $SW_{41}$ and the second switch $SW_{42}$ are serially connected between a bias circuit 105d and the reference ground potential VSS. For example, the first end of the first switch $SW_{41}$ is connected with the bias circuit 105d; the second end of the first switch $SW_{41}$ is connected with the first end of the second switch $SW_{42}$; and the second end of the second switch $SW_{42}$ is connected with the referential ground potential VSS. The first switch $SW_{41}$ and the second switch $SW_{42}$ are controlled by a control signal SQ generated by the output end Q of the RS trigger 105a (a port Q of the RS trigger is defined as an output end; a port QN is defined as a non-end Q or a complementary output end). For example, the control signal SQ is coupled with the control end of the first switch $SW_{41}$ after passing through a buffer and coupled with the control end of the second switch $SW_{42}$ through an inverse phase signal generated by a phase inverter 105e. As such, when-n the first switch $SW_{41}$ is turned on, the second switch $SW_{42}$ needs to be turned off, or when the first switch $SW_{41}$ is turned off, the second switch $SW_{41}$ needs to be turned on.

The resistor $R_{D1}$ and the resistor $R_{D2}$ of the voltage divider (FIG. 1) divide and capture a partial voltage of the output voltage $V_O$, which is the feedback voltage $V_{FB}$. The feedback voltage $V_{FB}$ is inputted into an inverting input terminal of a first comparator A1 in the second controller 105, while a first reference voltage $V_{REF}$ is inputted into a non-inverting input end of a first comparator A1. In another embodiment, the sensing resistor $R_C$ serially connected with the load 18 captures the sensing voltage $V_{CS}$ flowing through the load 18, and the sensing voltage $V_{CS}$ is inputted into the inverting input terminal of the first comparator A1 in the second controller 105. The output end of the first comparator A1 is connected with a setting end S of the RS trigger 105a. A signal $S_{ON}$ outputted from an on-time generator 105c in the second controller 105 is inputted into a reset end R of the RS trigger 105a, and a one-shot trigger 105b is connected between the output end Q of the RS trigger 105a and the on-time generator 105c. In the circuit from the first switch $SW_{41}$ and the second switch $SW_{42}$ to the reference ground potential VSS in the second controller 105, a node $N_2$ serves as a common node for the second end of the first switch $SW_{41}$ and the first end of the second switch $SW_{42}$, and a node $N_4$ is at the second end of the second switch $SW_{42}$ and connected with the reference ground potential VSS.

The first controller 104 comprises a second comparator A2, a node $N_1$ connected with the non-inverting input terminal of the second comparator A2, a node $N_3$ connected with the ground terminal GND, and a resistor $R_{41}$ connected between the nodes $N_1$ and $N_3$. A second reference voltage $V_{TH}$ is inputted into the inverting input terminal of the second comparator A2. A capacitor $C_{21}$ of the coupling element 106 is connected between the node $N_1$ of the first controller 104 and the node $N_2$ of the second controller 105, and a capacitor $C_{22}$ of the coupling element 106 is connected between the node $N_3$ of the first controller 104 and the node $N_4$ of the second controller 105. The coupling element 106 has similar data transmission effects as an Ethernet. For example, the node $N_1$ can be taken as a receiving interface RX1+ of the first controller 104, the node $N_3$ can be taken as a receiving interface RX2− of the first controller 104, correspondingly, the node $N_2$ can be taken as a transmitting interface TX1+ of the second controller 105, and the node $N_4$ can be taken as a transmitting interface TX2− of the second controller 105.

Figure 6B:
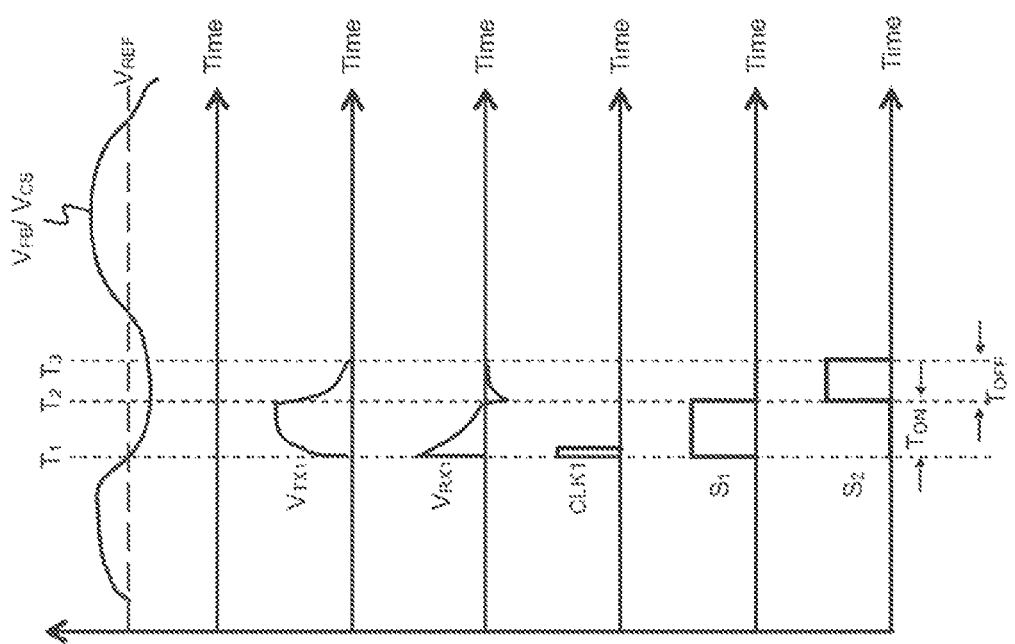
FIG. 6B are waveforms showing a first pulse signal and a second pulse signal generated along with change of the output voltage or current on the basis of FIG. 6A.

A first pulse signal $S_1$ for controlling the master switch Q1 is generated through the cooperation of the first controller 104 and the second controller 105 as shown in FIGS. 6A and 6B. When the feedback voltage $V_{FB}$ or the sensing voltage $V_{CS}$ is inputted into the inverting end of the first comparator A1 in the second controller 105, and when the feedback voltage $V_{FB}$ or the sensing voltage $V_{CS}$ starts to be lower than the first reference voltage $V_{REF}$ inputted at the non-inverting end, which occurs at the moment $T_1$ in FIG. 6B, the output result of the first comparator A1 is at a logic high level, so that the RS trigger 105a outputs the control signal SQ from the output end Q at the logic high level. Thus, the control signal SQ is communicated with the first switch $SW_{41}$ in FIG. 6A, and the second switch $SW_{42}$ is turned off as the control signal SQ is at the logic low level after passing the phase inverter 105e. As the second switch $SW_{42}$ is turned off when the first switch $SW_{41}$ is turned on, the reference ground potential VSS is lower than the potential of the ground terminal GND, signal is transmitted between the second controller 105 and the first controller 104 forming a current channel on a LOOP1 comprising the bias circuit 105d, the first switch $SW_{41}$, the node $N_2$, the capacitor $C_{21}$, the node $N_1$, the resistor $R_{41}$, the node $N_3$, the capacitor $C_{22}$, the node $N_4$, and the reference ground potential VSS, as such a positive power supply source provided by the bias circuit 105d flows through the first switch $SW_{41}$ and the node $N_2$ and starts to charge the capacitor $C_{21}$ in the coupling element 106 changing the charge voltage $V_{TX1}$ at the node $N_2$, or the transmitting interface TX1+, as shown in FIG. 6B with the charge voltage $V_{TX1}$ increased gradually. The change of the charge voltage VRX1 at the node N1, or the receiving interface RX1+, is also shown in FIG. 6B. As the voltages at two ends of the capacitor $C_{21}$ cannot be changed abruptly, the maximum value of the voltage $V_{RX1}$ is achieved at the moment T1, and the voltage VRX1 at the receiving interface RX1+ is gradually reduced while the voltage of a polar plate of the capacitor $C_{21}$ is gradually increased. In the period from $T_1$ to $T_2$, as the charge voltage $V_{RX1}$ at the node $N_1$, or the receiving interface RX1+, is greater than the second reference voltage $V_{TH}$, the first pulse signal $S_1$ outputted from the second comparator A2 is at the logic high level and is coupled with the control end of the master switch Q1. As the first pulse signal $S_1$ already starts to control the master switch Q1, in the Start-Up period of the voltage converter, the initial pulse signal outputted from the driving control circuit and used for controlling the master switch Q1 in the first controller 104 is stopped, so that the master switch Q1 is completely controlled by the first pulse signal $S_1$ unless the master switch Q1 needs to be started by the initial pulse signal to start the voltage converter.

As shown in FIG. 6B, the first pulse signal $S_1$ extends from the moment $T_1$ to a moment $T_2$, then the turn-on time $T_{ON}$ set by the on-time generator 105c is ended. A signal $S_{ON}$ at the logic high level generated by on-time generator 105c and used as a reset signal is transmitted to the reset end S of the RS trigger 105a, thus the control signal SQ outputted from the output end Q of the RS trigger 105a is converted to the logic low level, which turns off the first switch $SW_{41}$ in FIG. 6A. However, the second switch $SW_{42}$ is turned on when the control signal SQ is inverted to the logic high level after passed through the phase inverter 105e. As the second switch $SW_{42}$ is turned off when the first switch $SW_{41}$ is turned on, a part of charges stored in the capacitor $C_{21}$ and the capacitor $C_{22}$ is consumed by the resistor $R_{41}$ from the second controller 105 to the first controller 104 along a closed LOOP2 comprising the node $N_2$, the second switch $SW_{42}$, the node $N_4$, the capacitor $C_{22}$, the node $N_3$, the resistor $R_{41}$, the node $N_1$, the capacitor $C_{21}$ and the node $N_2$. Therefore, from the moment $T_2$, charges are released from the capacitor $C_{21}$, then the charge voltage $V_{TX1}$ at the node $N_2$, or the transmitting interface TX1+, is gradually reduced. At the moment $T_2$, as the voltage of the capacitor $C_{21}$ cannot be changed abruptly, the voltage $V_{RX1}$ at the node $N_1$, or the receiving interface RX1+, can be reduced to be temporarily negative; along with charge release of the capacitor $C_{21}$ and the capacitor $C_{22}$, and the voltage $V_{RX1}$ at the receiving interface RX1+ is approximately equal to zero potential at a moment $T_3$. The voltage $V_{TX1}$ at the node $N_2$, or the transmitting interface TX1+, is also approximately equal to zero potential at the moment $T_3$. In the period from $T_2$ to $T_3$, as the voltage $V_{RX1}$ at the node $N_1$, or the receiving interface RX1+, is less than a second reference voltage $V_{TH}$, for example approximately to the zero potential, the first pulse signal $S_1$ outputted from the second comparator A2, is at the logic low level, thus the master switch Q1 is turned off. As shown in FIG. 6B, the turn-on time $T_{ON}$ from the moment $T_1$ to the moment $T_2$ is the period that the master switch Q1 is turned on and the turn-off time $T_{OFF}$ from the moment $T_2$ and the moment $T_3$ is the period that the master switch Q1 is turned off. In addition, as shown in FIG. 1, the second pulse signal $S_2$ is the inverse phase signal of the first pulse signal S1 or the control signal SQ, so that the logic states of the second pulse signal $S_2$ at the turn-on time $T_{ON}$ and the turn-off time $T_{OFF}$ are opposite to those of the first pulse signal $S_1$, and the second controller 105 is adapted to generate the second pulse signal $S_2$ for controlling the synchronous switch Q2 of the secondary winding.

In the period the master switch Q1 is turned on, primary current flows through the primary winding $L_P$ to store energy, and at the moment, as the synchronous switch Q2 is turned off, no current flows through the secondary winding $L_S$, and power can be provided to the load 18 through the output capacitor $C_{OUT}$. In the period that the master switch Q1 is turned off, the primary current is reduced to zero, the energy of the primary winding $L_P$ is transferred to the secondary winding $L_S$ and the auxiliary winding $L_{AUX}$, which turns on the synchronous switch Q2, thus current flows through the secondary winding $L_S$ and the synchronous switch Q2. The load 18 is provided with current from the secondary winding $L_S$ and the output capacitor $C_{OUT}$ is charged, while the capacitor $C_{AUX}$ is also charged with power from the auxiliary winding $L_{AUX}$. The time-delay measurement for the turn-on time $T_{ON}$ is determined by the on-time generator 105c. As shown in FIG. 6A and FIG. 6B, the one-shot trigger 105b can be triggered at the rising-edge of the control signal SQ outputted from the RS trigger 105a generating one temporary state pulse signal CLK1 of a nanosecond grade (the pulse signal CLLK outputted from the one-shot trigger or the one-shot circuit is generally in two logic states of temporary state and steady state). A narrow temporary state pulse signal CLK1 is at the high level (in the temporary state period) at the moment of rising-edge of the control signal SQ, and is at the low level at other moments (in the steady state period). The temporary state pulse signal CLK1 at the high level is adapted to inform the on-time generator 105c to start to time, and a signal $S_{ON}$ at the high level is transmitted from the on-time generator 105c to reset the RS trigger 105a at the moment that the preset turn-on time $T_{ON}$ is just reached, therefore, the control mode is a constant on time control mode, and in the present invention, in each switch period, the constant on time $T_{ON}$ can be also adjusted, for example, a minimum constant on time $T_{ON-MIN}$ or maximum constant on time $T_{ON-MAX}$ that meets the requirements can be designed.

Figure 6C:
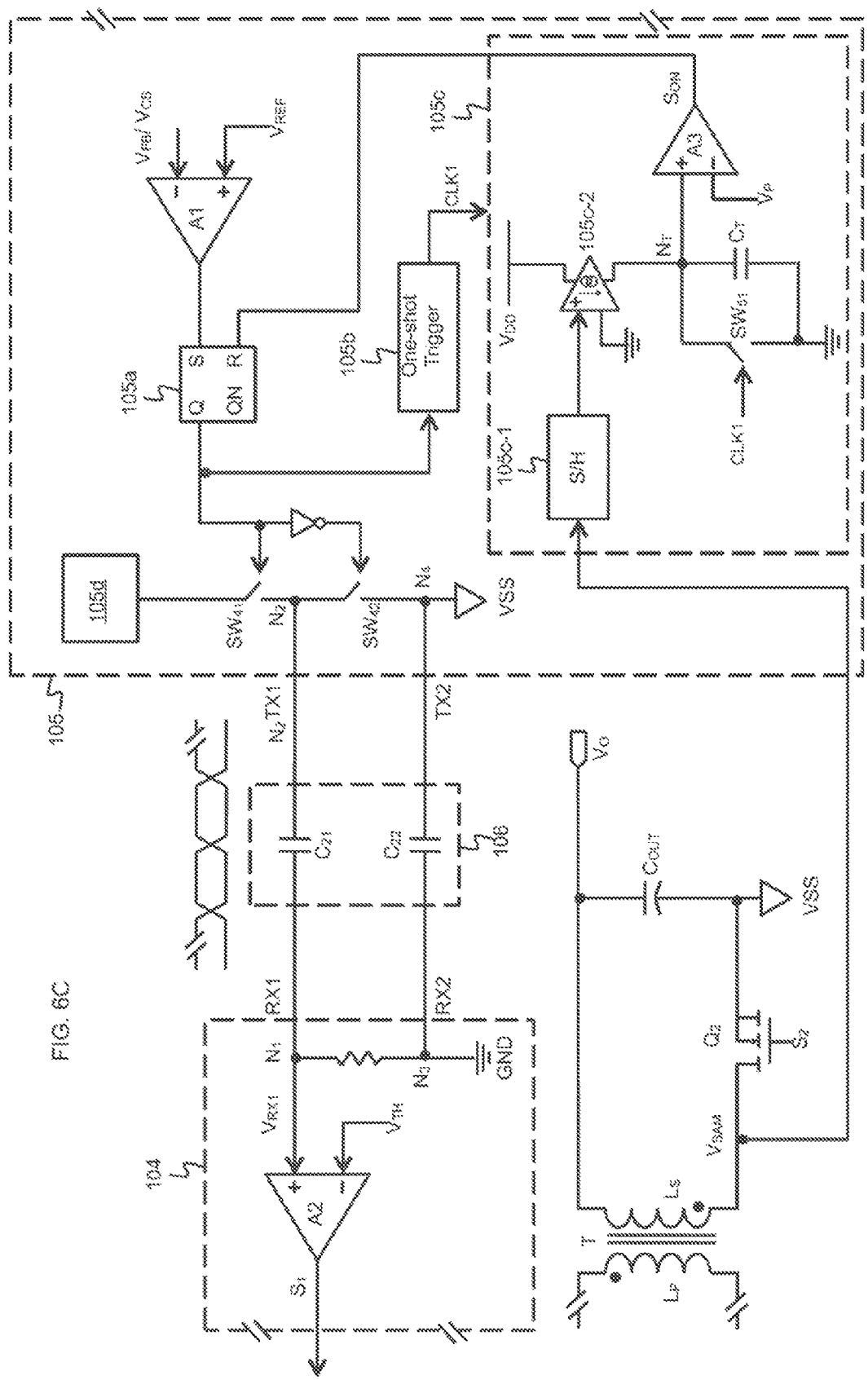
FIG. 6C is a circuit diagram showing the mode for enabling the turn-on time of the master switch to be adjustable in the second controller on the basis of FIG. 6A.
Figure 6D:
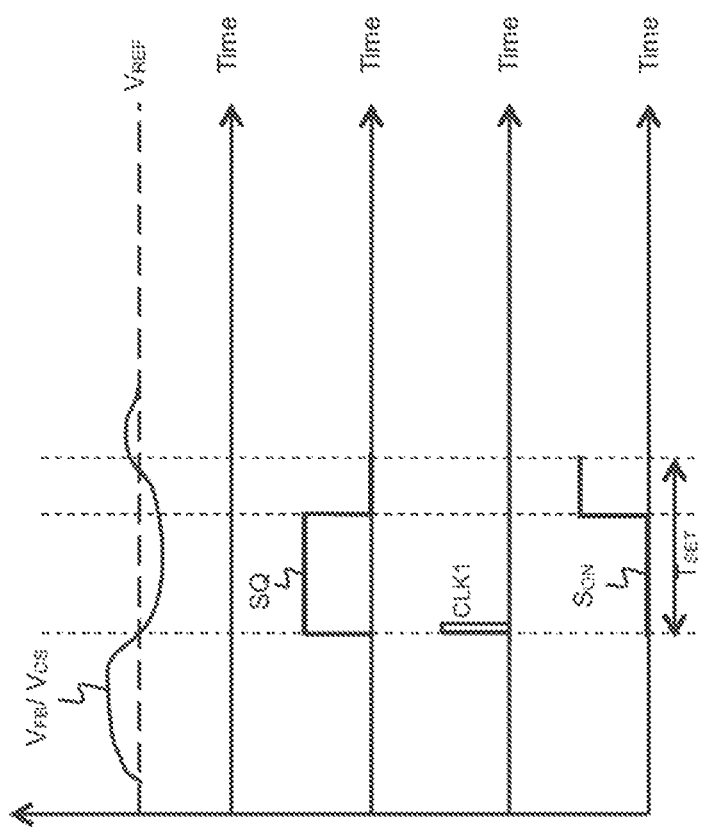
FIG. 6D is waveforms showing the adjusting the turn-on time on the basis of FIG. 6C.

FIG. 6C is an alternative mode of the one in FIG. 6A. The on-off frequency f of the master switch Q1 is reduced as the input voltage $V_{IN}$ is increased vice versa, and the frequency f is reduced as the turn-on time $T_{ON}$ is increased or vice versa. If the on-off frequency f is too small, the magnetic core flux of the transformer T cannot be recovered to the starting point of a hysteresis loop and a magnetic core is over-saturated. The transformer T can be saturated if the on-off frequency f is too small as the input voltage $V_{IN}$ is increased, and at the moment the magnetic core can be easily burn if the voltage is not generated. In this embodiment, the problems can be overcome. When the master switch Q1 is turned on and the synchronous switch Q2 is turned off, no current flows through the secondary winding $L_S$, but the voltage sampling $V_{SAM}$ captured at the second end of the secondary winding $L_S$ and the first end of the synchronous switch Q2 at the moment is generally equal to the ratio of the number of turns NS of the secondary winding $L_S$ to the number of turns NP of the primary winding $L_P$ multiplied with the input voltage $V_{IN}$. In the other words, the voltage $V_{SAM}$ is associated with the input voltage $V_{IN}$. The voltage $V_{SAM}$ can be sensed by the on-time generator 105c, and therefore an appropriate turn-on time $T_{ON}$ is designed to inhibit magnetic core saturation caused by abnormal state of the on-off frequency value f. As shown in FIGS. 6C and 6D, if the sensing voltage drop $V_{CS}$ or the feedback voltage $V_{FB}$ is less than the first reference voltage $V_{REF}$, the first comparator A1 outputs a high level signal to the setting end S of the RS trigger 105a, and the control signal SQ generated by the output end Q of the RS trigger 105a is turned from the low level to the high level, and the one-shot trigger 105b generates a high level temporary state pulse signal CLK1 at the rising-edge as the control signal SQ is turned from the low level to the high level when the control signal SQ is sent to the one-shot trigger 105b. The on-time generator 105c comprises a sampling holder (S/H) 105c-1, a voltage-current converter 105c-2, a third switch $SW_{51}$ and a capacitor $C_T$. The input end of the sampling holder 105c-1 is connected with the second end of the secondary winding $L_S$, while the output end of the sampling holder 105c-1 is connected with the voltage input end of the voltage-current converter 105c-2 provided with a working voltage through the power supply voltage $V_{DD}$. The current output end of the voltage-current converter 105c-2 and one end of the capacitor $C_T$ are connected with a node $N_T$, and another end of the capacitor $C_T$ is connected with the ground terminal GND. The first end of the third switch $SW_{51}$ is connected with the node $N_T$, and the second end is connected with the ground terminal GND, so that the third switch $SW_{51}$ and the capacitor $C_T$ are connected in parallel, and the temporary state pulse signal CLK1 generated by the one-shot trigger 105b is inputted into the control end of the third switch $SW_{51}$. The on-time generator 105c further comprises a third comparator A3 having the non-inverting input terminal connected with the node $N_T$ and the inverting end inputted with a third reference voltage $V_P$.

As shown in FIG. 6C, the on-time $T_{ON}$ is adjusted by the on-time generator 105c such that the sampling holder 105c-1 is provided a sample voltage $V_{SAM}$ from the second end of the secondary winding $L_S$ when the master switch Q1 is turned on and the synchronous switch Q2 is turned off, such that the larger the input voltage $V_{IN}$ is, the higher the voltage $V_{SAM}$ held by the sampling holder 105c-1 is, the larger the current outputted from the voltage-current converter 105c-2 is; as is vice versa. When the temporary state pulse signal CLK1 for driving the third switch $SW_{51}$ is at the high level at the rising-edge of the control signal SQ generated by the RS trigger 105a, which is at the low level at other time, the third switch $SW_{51}$ is turned on at the moment of rising-edge of the control signal SQ, thus the charges stored at one end of the capacitor $C_T$, i.e., at the node $N_T$, are released; and then a signal $S_{ON}$ at the low level is generated from the output end of the third comparator A3 at the moment. As shown in FIG. 6D, a preset time $T_{SET}$ is started at the rising-edge of the control signal SQ. After the rising-edge of the control signal SQ, the temporary state pulse signal CLK1 is converted to the low level again; the third switch $SW_{51}$ is turned off and the capacitor $C_T$ is charged with power through the current outputted from the voltage-current converter 105c-2. After the capacitor $C_T$ is charged in the on-time period $T_{ON}$ and after the on-time period $T_{ON}$ is ended, the voltage at the node $N_T$ is greater than the third reference voltage $V_P$ during the off-time period Tow. As a result, the signal $S_{ON}$ generated at the output end of the third comparator A3 is turned to the high level during the off-time period $T_{OFF}$ from the low level during the on-time period $T_{ON}$ and then is inputted into the reset end R of the RS trigger 105a to reset the RS trigger 105a, and thus control signal SQ generated by the output end Q of the RS trigger 105a is changed to the low level during the off-time period $T_{OFF}$ from the high level during the on-time period $T_{ON}$. The control signal SQ is continuously at the low level until the off-time period $T_{OFF}$ is ended unless the sensing voltage drop $V_{CS}$ or the feedback voltage $V_{FB}$ is less than the first reference voltage $V_{REF}$, and the first comparator A1 regenerates the high level signal to set the RS trigger 105a to output the high level control signal SQ. The signal $S_{ON}$ generated at the output end of the third comparator A3 is continuously at the high level during the off-time period $T_{OFF}$ until the off-time period is ended unless the control signal SQ has a rising-edge, then the temporary pulse signal CLK1 is at the high level to turn on the third switch $SW_{51}$, the node $N_T$ of the capacitor $C_T$ is in transient discharge, and a signal $S_{ON}$ at the low level is then generated by the third comparator A3.

As mentioned above, the larger the input voltage $V_{IN}$ is, the larger the voltage held by the sampling holder 105c-1 is, and then the larger the current outputted from the voltage-current converter 105c-2 is, so that the charge time is shortened, thus the voltage at the node $N_T$ at one end of the capacitor $C_T$ can rapidly exceed the third reference voltage $V_P$, and the $T_{ON}$ is shortened during the whole on-off period with the control signal SQ at the high level and the master switch Q1 turned on during the period $T_{ON}$. As a result the larger the input voltage $V_{IN}$ is, the shorter the on-time $T_{ON}$ is, and correspondingly, the control signal SQ during the period $T_{OFF}$ is at the low level and the master switch Q1 is turned off during this period. In other words, although the input voltage $V_{IN}$ is increased, the on-off frequency value f is reduced, and the reduction of the on-off frequency value f is suppressed consequently when the on-time $T_{ON}$ is shortened. Vice versa, the smaller the input voltage $V_{IN}$ is, the smaller the voltage held by the sampling holder 105c-1 is, and then the smaller the current outputted from the voltage-current converter is, so that the charge time can be prolonged and the voltage at the node $N_T$ at one end of the capacitor $C_T$ can exceed the third reference voltage $V_P$ in a relatively slow speed, thus the period $T_{ON}$ is appropriately prolonged during the whole on-off period. Therefore, the smaller the input voltage $V_{IN}$ is, the longer the turn-on time $T_{ON}$ of the master switch is consequently. In other words, although the input voltage $V_{IN}$ is reduced to increase the on-off frequency value f, the increasing of the on-off frequency value f is inhibited if the on-time $T_{ON}$ is prolonged. Therefore, the embodiment of the invention can greatly ensure the relative steady state of the on-off frequency value f.

For example, the on-off frequency value f is equal to $(2*I_O*L*V_O)/\{(V_{IN})2*(T_{ON})^2\}$ in a non-continuous DCM mode, where L is the equivalent inductance of the transformer T, and according to the scheme provided by the invention, no matter the input voltage $V_{IN}$ is reduced or increased, the value of $(V_{IN})^2*(T_{ON})^2$ in the function is not greatly changed, and the change of the on-off frequency value f can be inhibited, so that the transformer T can be prevented from being damaged after being saturated.

Figure 7A:
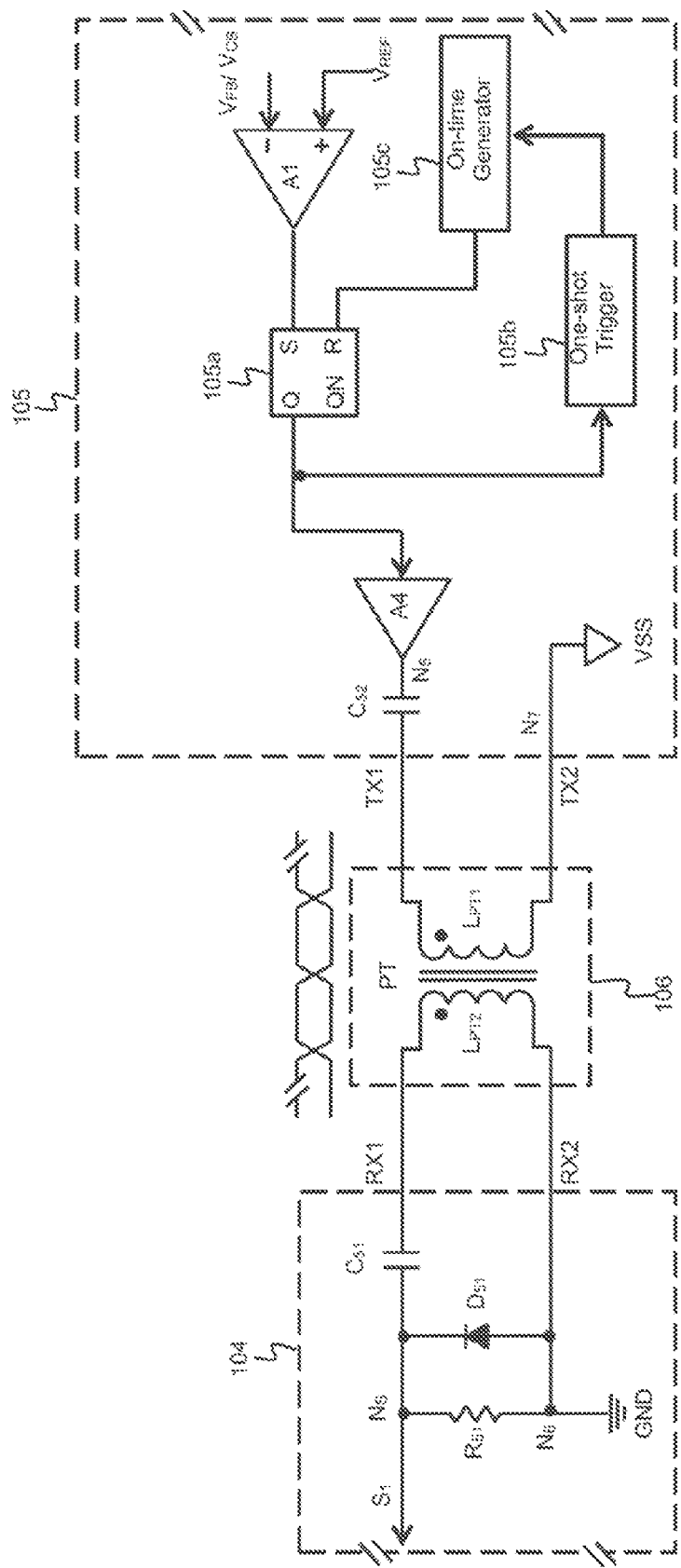
FIG. 7A is a circuit diagram showing the mode that the control signal is transmitted to the first drive from the second controller of the secondary winding by using the pulse transformer.
Figure 7B:
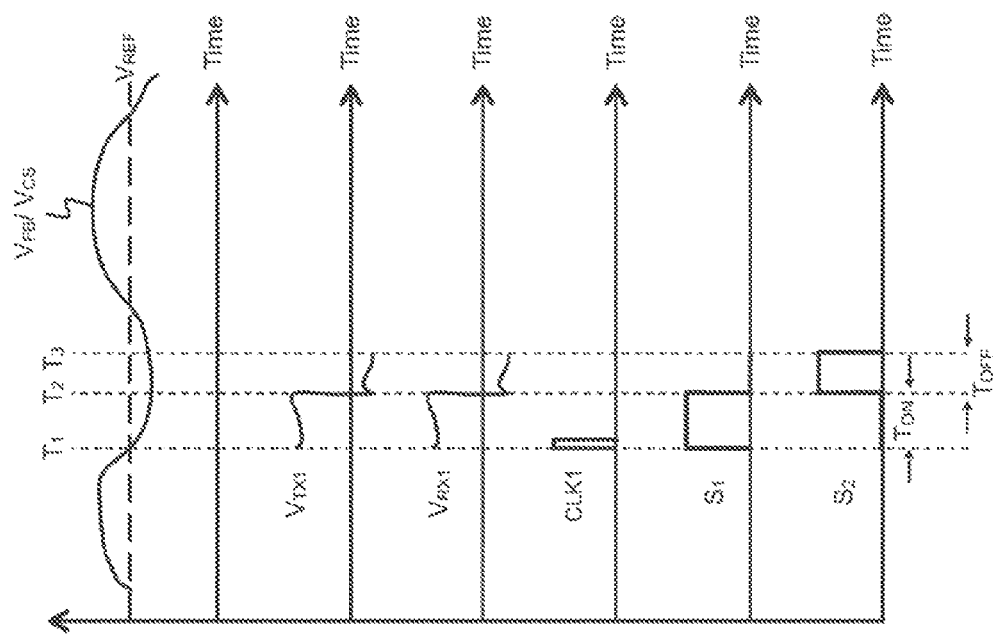
FIG. 7B are waveforms showing that the first pulse signal and the second pulse signal are generated along with change of the output voltage or current on the basis of FIG. 7A.

Compared with FIG. 6A, the components of the coupling element 106 of the circuit diagram of FIG. 7A are different than that of FIG. 6A. The coupling element 106 is a pulse transformer PT. The circuit and the mode for generating the control signal SQ for the second controller 105 are similar to those of FIG. 6A. In this embodiment, the pulse transformer PT is used as a transmission media for data signal interaction between the first controller 104 and the second controller 105, and is provided with a primary winding $LP_{T1}$ and a secondary winding $LP_{T2}$, in which the primary winding $LP_{T1}$ is connected with the second controller 105, and the secondary winding $LP_{T2}$ is connected with the first controller 104. The first end of the primary winding $LP_{T1}$ is adapted to receive the control signal SQ generated by the RS trigger 105a, and the second end is coupled with the reference ground potential VSS. The first end of the secondary winding $LP_{T2}$ is adapted to generate the first pulse signal $S_1$ for driving the master switch Q1, and the second end is coupled with the ground terminal GND. In the embodiment of FIG. 7A, the control signal SQ is inputted at the first end of the primary winding $LP_{T1}$, and the first pulse signal $S_1$ is outputted from the first end of the secondary winding $LP_{T2}$. The control signal SQ is transmitted to the input end of the buffer A4, passing through a capacitor $C_{52}$ connected between the output end, which is a node $N_5$, of the buffer A4 and the first end of the primary winding $LP_{T1}$, and the second end of the primary winding $LP_{T1}$ is connected with a relatively low potential, for example a reference ground potential VSS at a node $N_7$. A capacitor $C_{51}$ is connected between the first end of the secondary winding $LP_{T2}$ and a signal generation node $N_S$ for outputting the first pulse signal S1, and the second end of the secondary winding $LP_{T2}$ is connected with the ground terminal GND at a node $N_6$. In addition, the cathode of a diode $D_{51}$ is optionally connected with the node $N_S$, and the anode is connected with the ground terminal GND at the node $N_6$, and a resistor $R_{51}$ is optionally connected between the node $N_S$ and the node $N_6$. The working mechanism of the pulse transformer PT is that the capacitor $C_{52}$ is adapted to isolate the direct current, and when the control signal SQ is converted to the high level to charge the capacitor $C_{52}$, the potential at the first end of the primary winding $L_{PT1}$ is also increased. FIG. 7B shows the waveform of the voltage $V_{TX1}$ of the transmitting interface TX1+ at the first end of the primary winding $L_{PT1}$, while the node at the second end of the primary winding $L_{PT1}$ is taken as a transmitting interface TX2−. The control signal SQ is transmitted to the secondary winding $L_{PT2}$ through the pulse transformer PT, which increases the potential at the first end of the secondary winding $L_{PT2}$. A waveform of the voltage $V_{RX1}$ of the receiving interface RX1 at the first end of the secondary winding $L_{PT2}$ is as shown in FIG. 7B, and the second end of the secondary winding $L_{PT2}$ is taken as a receiving interface RX2−. In the process, as the potential of the node $N_S$ is also synchronously increased due to the coupling function of the capacitor $C_{51}$, the potential of the node $N_S$ is rapidly increased by the clamping effect of the Schottky diode $D_{51}$, and a first pulse signal S1 at the high level is outputted from the node $N_S$. On the contrary, once the control signal SQ is converted to the low level, the capacitor $C_{52}$ discharges through the primary winding $L_{PT1}$, and the capacitor $C_{51}$ also discharges through the secondary winding $L_{PT2}$ and the resistor $R_{51}$, so that the potential of the signal generation node $N_S$ is rapidly dropped, thus the first pulse signal S1 at the low level is generated at the signal generation node $N_S$ and is synchronously changed along with logic state of the control signal SQ. The waveform of a second pulse signal $S_2$, which is an inverse phase signal of the first pulse signal S1, is also shown in FIG. 7B.

Figure 7C:
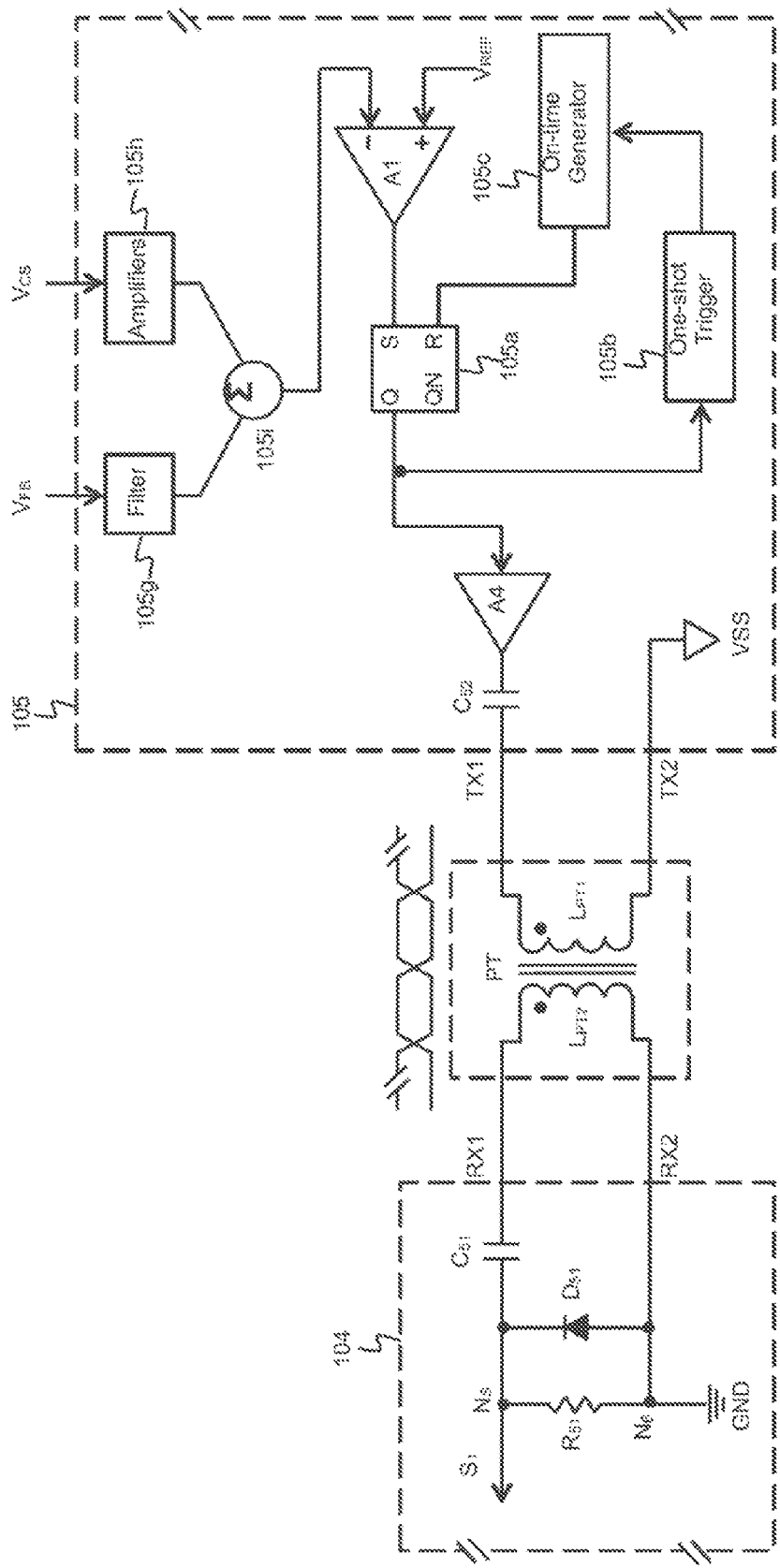
FIG. 7C is a circuit diagram showing that output results of a filter and an amplifier are overlapped and are further compared with a reference voltage on the basis of FIG. 7A.
Figure 8:
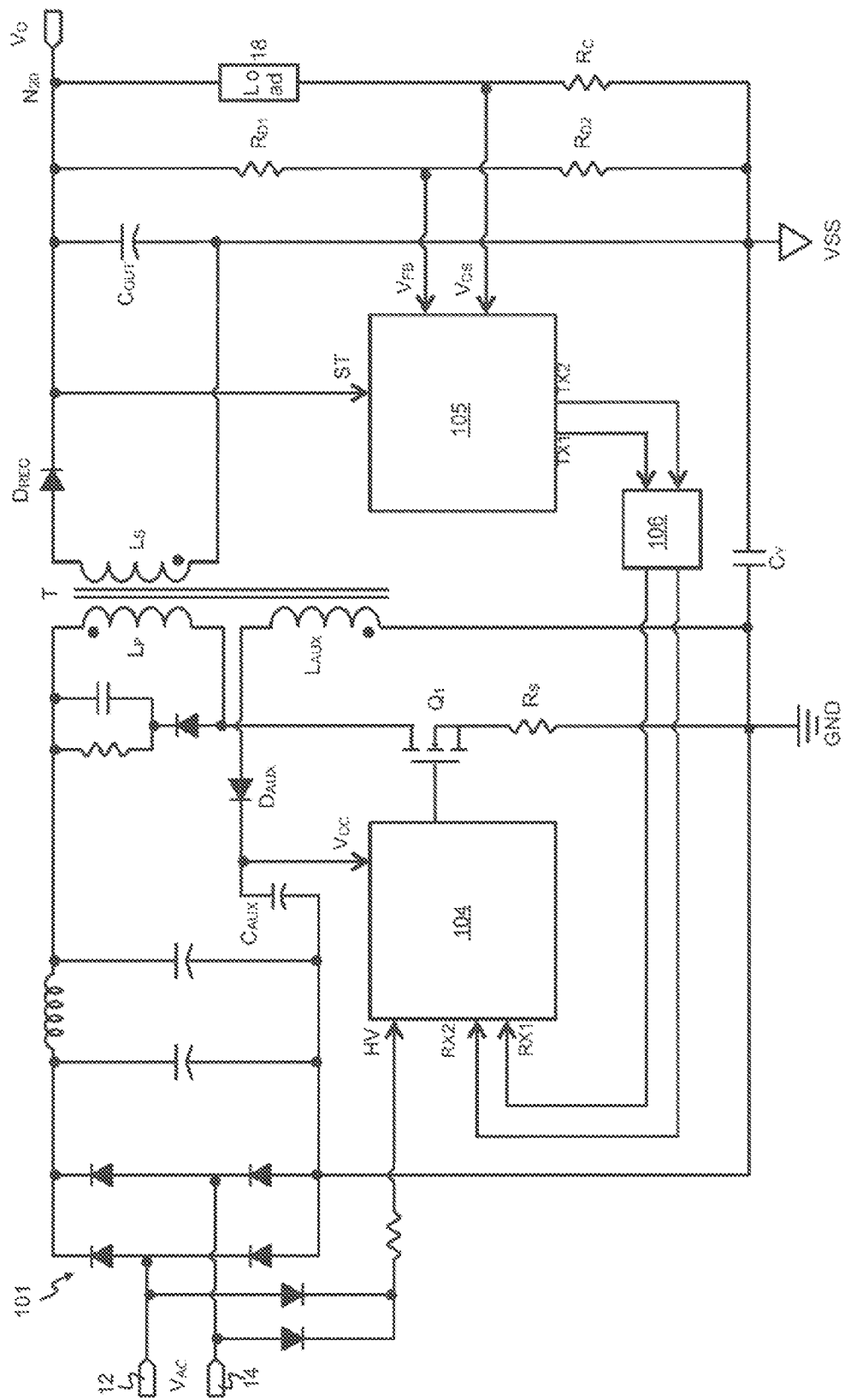
FIG. 8 is a circuit diagram of a voltage converter showing that a synchronous switch of the secondary winding is replaced by a rectifier diode of the secondary winding.

The embodiment shown in FIG. 7C is slightly different from that of FIG. 7A. As shown in FIG. 7C, one of the feedback voltage $V_{FB}$ and the sensing voltage $V_{CS}$ is inputted into the inverting input terminal of the first comparator A1 in the second controller 105; however, in this embodiment, the feedback voltage $V_{FB}$ is firstly transmitted through a filter 105g and the sensing voltage $V_{CS}$ is firstly transmitted through an amplifier 105h, then the output of the filter 105g and the output of the amplifier 105h are combined through an adder 105i and are further transmitted into the inverting input terminal of the first comparator A1. The waveform of an actual ripple voltage at an output node $N_{20}$ as shown in FIG. 1 or FIG. 8, which is described in detail later, comprises alternating current and direct current, where the average voltage of the ripple voltage is equivalent to the voltage of the direct current, and the voltage obtained by subtracting the voltage of the direct current from the total ripple voltage is actually equal to the voltage of the alternating current. The feedback voltage $V_{FB}$ is substantially a partial voltage of the actual ripple voltage captured at the output node $N_{20}$. In addition, the sensing voltage $V_{CS}$ represents the loading current $I_O$, and the direct current of the load current $I_O$, in the alternative-direct current, is much greater than the alternating current of the load current $I_O$, so that the average voltage of the sensing voltage $V_{CS}$, which also represents an alternative-direct current, is equal to the voltage of the direct current of the sensing voltage $V_{CS}$. As shown in FIG. 7C, the actual ripple voltage is transmitted to a filter 105g for filtering off the direct current of the actual ripple voltage and outputting the alternating current. In other words, the voltage of the direct current of the feedback voltage $V_{FB}$ is subtracted from the total voltage of the feedback voltage $V_{FB}$ through the filter 105g so as the feedback voltage $V_{FB}$ only includes the voltage of the alternating current. In addition, as shown in FIG. 7C, the voltage drop of the loading current $I_O$, which is the sensing voltage $V_{CS}$ generated by the sensing resistor $R_C$, is transmitted to the amplifier 105h and is outputted after being amplified by the amplifier 105h. The signal outputted from the filter 105g, which is the signal of the alternating current obtained after the direct current of the feedback voltage $V_{FB}$ is filtered off by the filter 105g, and the signal outputted from the amplifier 105h, which includes both the alternating current and the direct current and is obtained after the sensing voltage $V_{CS}$ is amplified through the amplifier 105h, are combined through the adder 105i and are subsequently transmitted into the inverting input terminal of the first comparator A1. Excepting that the feedback voltage $V_{FB}$ or the sensing voltage $V_{CS}$ is not sent directly to the inverting input terminal of the first comparator A1, the embodiment as shown in FIG. 7C is mostly identical to that as shown in FIG. 7A. In addition, the new feature including the signal outputted from the filter 105g and the signal outputted from the amplifier 105h then combined through the adder 105i and subsequently inputted into the inverting input terminal of the first comparator A1 is also applied to the embodiments of FIG. 6A and FIG. 6C.

Referring to FIG. 1 and FIG. 8, the only difference is that the first end of the secondary winding $L_S$ is connected with the output node $N_{20}$ through the rectifier diode $D_{REC}$ and the synchronous switch Q2 in FIG. 1 is omitted in FIG. 8 so that the second end of the secondary winding $L_S$ is directly coupled to the reference ground potential VSS. The anode of the rectifier diode $D_{REC}$ is connected with the first end of the secondary winding $L_S$, the cathode is connected with the output end $N_{20}$, and the starting voltage ST can be captured at the cathode of the rectifier diode $D_{REC}$. Since the synchronous switch Q2 is omitted, the second pulse signal $S_2$ is not generated. The operation mechanism of FIG. 8 is similar to that of FIG. 1.

In the voltage converter, if the load 18 is light or empty, the load current $I_O$ is reduced, the on-off frequency value f of the master switch Q1 is also reduced correspondingly to the load 18. In addition, the reduction of the on-off frequency value f can be recognized when the voltage converter makes a sound, for example, if the on-off frequency value f is too low causing the parasitic oscillation, and the noise made from a transformer may indicate that the on-off frequency value f is reduced to be about 20 Hz.

Figure 9:
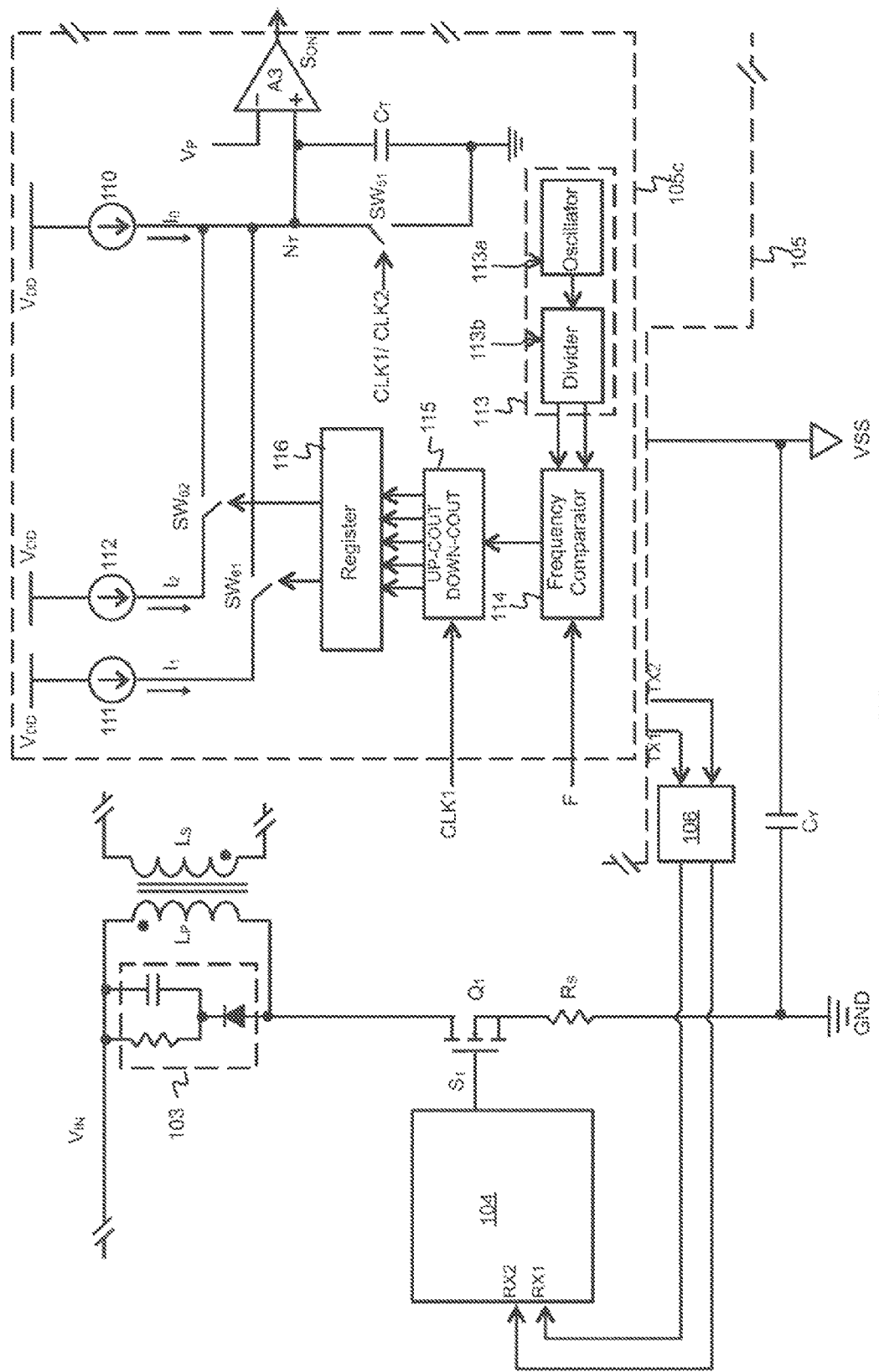
FIG. 9 is a circuit diagram showing the mode for adjusting the turn-on time of the master switch when the load is lightened.

FIG. 9 illustrates a circuit diagram of a voltage converter that solves the problem of the noise generated by the reduction of the on-off frequency value f as mentioned above. Referring to FIG. 6A, FIG. 7A or FIG. 7C respectively, the detection signal DE, either the feedback voltage $V_{FB}$, the sensing voltage $V_{CS}$, or a detection signal DE outputted from the adder 105i, can be adapted to represent the real-time intensity of the output voltage $V_O$ and/or the load current $I_O$ provided to the load 18 and is inputted into the inverting input terminal of the first comparator A1. In one example referring to FIG. 7C, the detection signal DE is inputted into the inverting input terminal of the first comparator A1, and the first reference voltage $V_{REF}$ is inputted into the non-inverting input terminal of the first comparator A1. When the detection signal DE is lower than the first reference voltage $V_{REF}$, the setting end S of the RS trigger 105a is set up due to the high level signal outputted from the first comparator A1, thus the RS trigger 105a outputs the control signal SQ at the high level, and when the high level signal $S_{ON}$ generated by the on-time generator 105c is transmitted to the reset end R of the RS trigger 105a, the RS trigger 105a outputs the control signal SQ at the low level, which is already specifically described above.

Figure 10:
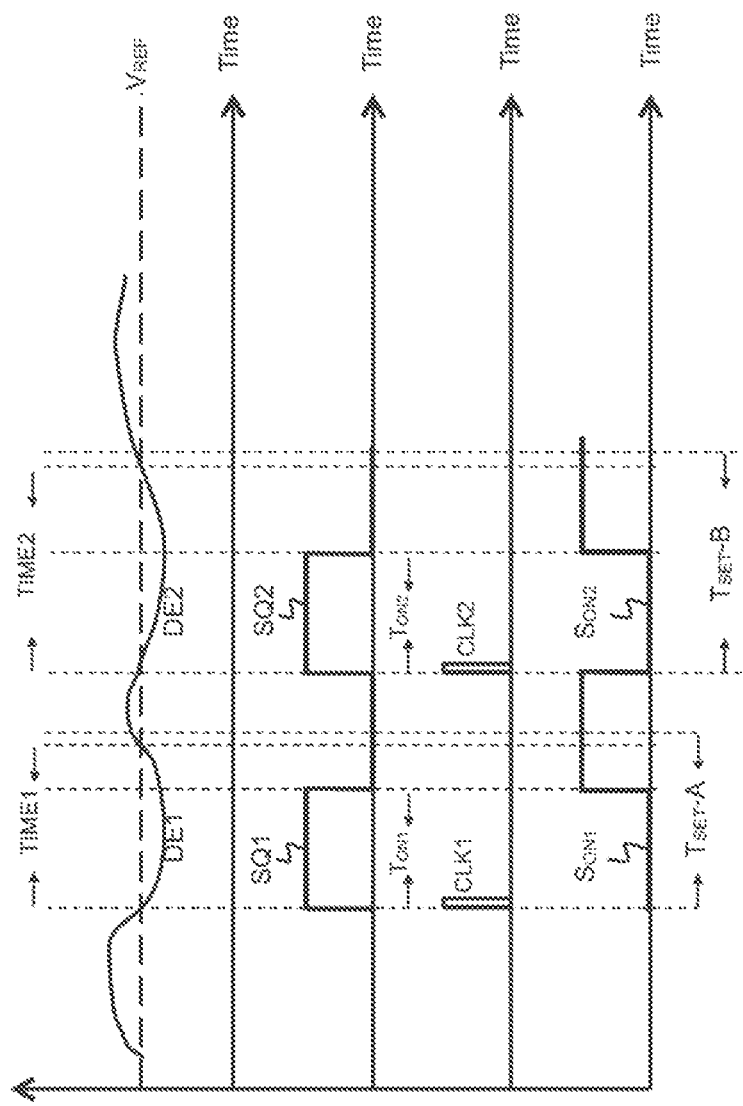
FIG. 10 is waveforms showing that the master switch turn-on time determined by a later control signal is suppressed by a former control signal on the basis of FIG. 9.

FIG. 9 only shows a portion of the voltage converter, and specifically showing the components of the on-time generator 105c. As shown in FIG. 9 and FIG. 10, once the detection signal DE is lower than the first reference voltage $V_{REF}$, the one-shot trigger 105b generates the temporary state pulse signal CLK at the rising-edge of the control signal SQ when it jumps from the low level to the high level. FIG. 10 illustrates the waveforms taking at two adjacent periods in which the detection signal DE is lower than the first reference voltage $V_{REF}$. For example, if the detection signal DE, which is the detection signal DE1 in FIG. 10, is lower than the first reference voltage $V_{REF}$ in a first period TIME1, the voltage converter generates the control signal SQ1 to turn on the master switch Q1 to increase the output voltage $V_O$ and/or the load current $I_O$, then the detection signal DE is changed to be greater than the first reference voltage $V_{REF}$ at the ending point of the first period TIME1, and when the detection signal DE, which is the detection signal DE2 in FIG. 10, is lower than the first reference voltage $V_{REF}$ again in a second period TIME2, the voltage converter generates the control signal SQ2 to turn on the master switch Q1 to increase the output voltage $V_O$ and/or the load current $I_O$ again. Finally, the detection signal DE is adjusted to be greater than the first reference voltage $V_{REF}$ at the ending point of the second period TIME2, and thus the whole cycle is repeated.

As shown in FIG. 10, the detection signal DE1 in the first period TIME1 is lower than the first reference voltage $V_{REF}$. At the starting moment of the first period TIME1, the RS trigger 105a is set according to the high level signal outputted from of the first comparator A1 generating the control signal SQ1 at the high level, and at the moment, the control signal SQ1 is converted from the low level to the high level, then the one-shot trigger 105b generates a narrow pulse at the high level, or the temporary state pulse signal CKL1, and the process is similar to that described above with the combination of FIGS. 6A and 7A. The temporary state pulse signal CKL1 generated by the one-shot trigger 105b triggers the on-time generator 105c to time the on-time $T_{ON1}$, and during the on-time $T_{ON1}$ the master switch Q1 is turned on, the signal $S_{ON1}$ generated by the third comparator A3 is continuously at the low level. After the on-time $T_{ON1}$ is ended, the signal $S_{ON1}$ generated by the third comparator A3 is turned to the high level thus resetting the RS trigger 105a turning the control signal SQ1 to the low level state. As shown in FIG. 10, which only illustrates two on-off periods of the master switch Q1 for an example, one preset time $T_{SET}$-A is started from the starting point of the first period TIME1, after one or multiple on-off periods when the preset time $T_{SET}$-A is ended, the detection voltage DE is greater than the first reference voltage $V_{REF}$, and the control signal SQ1 is at the low level. In addition, the temporary state pulse signal CKL1 is not at the high level, thus the capacitor $C_T$ has no transient discharge, and the signal $S_{ON1}$ outputted from the third comparator A3 is kept being at the high level.

As shown in FIG. 10, after the first period TIME1 is ended, due to the voltage modulation effect of the voltage converter, the detection signal DE2 is increased to be greater than the first reference voltage $V_{REF}$, and thus the output signal from the first comparator A1 is at the low level. After a time interval, the RS trigger 105a generates a control signal SQ2 at the high level according to the high level output signal of the first comparator A1 at the starting moment of the second period TIME2 when the detection signal DE2 in the second period TIME2 is lower than the first reference voltage $V_{REF}$ again. At this moment, the control signal SQ2 is turned from the low level to the high level, so that the one-shot trigger 105b generates a narrow temporary state pulse signal CKL2 at the high level adapted to trigger the capacitor $C_T$ to discharge to a voltage lower than a third reference voltage $V_P$, thus the on-time generator 105c starts to time the turn-on time $T_{ON2}$, and the signal $S_{ON2}$ generated by the third comparator A3 is continuously at the low level and the master switch Q1 is turned on during the turn-on time $T_{ON2}$. After the turn-on time $T_{ON2}$ is ended, the capacitor $C_T$ is charged to a voltage greater than the third reference voltage $V_P$, and the signal $S_{ON2}$ at the high level generated by the third comparator A3 in the on-time generator 105c resets the RS trigger 105a, thus the control signal SQ2 is converted into the low level state. During the second period TIME2, as shown in FIG. 10, one preset time $T_{SET}$-B is started from the starting point of the second period TIME2, after one or multiple on-off periods when the preset time $T_{SET}$-B is ended, the detection voltage DE is greater than the first reference voltage $V_{REF}$ to meet the load requirements. At this moment, the control signal SQ2 is at the low level, but the temporary state pulse signal CLK2 is not at the high level yet, thus the capacitor $C_T$ has no transient discharge, and the signal $S_{ON2}$ outputted from the third comparator A3 is still at the high level.

As shown in FIG. 9, the output signal, which is either the feedback voltage $V_{FB}$, the sensing voltage $V_{CS}$ or the output voltage from the adder 105i, is lower than the first reference voltage $V_{REF}$ in the period of the preset time $T_{SET}$-A and preset time $T_{SET}$-B so that the transformer T can be prevented from making a noise when the on-off frequency value f is too low. As mention above, either the feedback voltage $V_{FB}$, the sensing voltage $V_{CS}$ or output voltage of the adder 105i is the detection signal DE. Referring to FIG. 9 and FIG. 10, the temporary state pulse signal CLK1 is generated when the control signal SQ1 during the preset time $T_{SET}$-A has a frequency value F, and when the temporary state pulse signal CLK1 is at the high level with narrow pulse for more than one times possibly, one or more frequency values F is generated. As shown in FIG. 9, a time generator 113 comprises an oscillator 113a and a frequency divider 113b, in which the oscillator 113a is adapted to generate an oscillation signal outputting to the frequency divider 113b, and the frequency divider 113b is adapted to change the frequency value of the oscillation signal to provide an upper frequency critical value $F_H$ and a lower frequency critical value $F_L$ outputted to a frequency comparator 114 as reference frequency values for comparing with the frequency F of the temporary state pulse signal CLK1 triggered by the rising-edge of the control signal SQ1. A counter 115 is provided with an addition calculator and a subtraction counter, and the initial count value of the counter 115 can be set up in advance. The counter 115 is limited to subtract 1 from the set initial count value when one frequency value F is greater than the upper frequency critical value $F_H$. The addition or the subtraction is implemented according to the comparison result of the frequency comparator 114 transmitted to the counter 115, and calculation rules defined in advance are executed through the counter 115 according to the result. During the preset time $T_{SET}$-A, depending on the comparison result of the frequency value F corresponding to the narrow temporary state pulse signal CLK1 at the high level and a reference frequency value, either the counter 115 will add 1 or subtract by 1, and the counter 115 counts for identical times (for example times) according to the number of frequency values F (for five different frequency values), and finally a total count value can be generated by the counter 115. In addition, the counter 115 follows some counting conditions, which is an upper critical count value and a lower critical count value are defined for the counter 115, once the total count value exceeds the upper critical count value, it is adjusted to be equal to the upper critical count value, or when the total count value is lower than the lower critical count value, it is adjusted to be equal to the lower critical count value, but when the total count value is equal to one of the upper critical count value and the lower critical count value, the total count value is not changed.

In one example, for illustration but not restriction to the embodiments of the invention, a plurality of narrow temporary state pulse signals CLK1 at the high level during the preset time $T_{SET}$-A have five different frequency values correspondingly, or the total number of the frequency values F of the temporary state pulse signals CLK1 is five. In this situation, the initial count value of the counter 115, which is the lower critical count value, is defined as the binary code element BIT[00] of two bits, and the upper critical count value is defined as a binary code element BIT[11] of two bits. When the total number of the frequency values F of the temporary state pulse signals CLK1 is five, each frequency value is compared with the upper critical frequency value $F_H$ and the lower critical frequency value $F_L$ in sequence through the frequency comparator 114, and the comparison result obtained includes a first frequency value lower than the lower critical frequency value $F_L$, a second frequency value greater than the upper critical frequency value $F_H$, a third frequency value lower than the lower critical frequency value $F_L$, a fourth frequency value greater than the upper critical frequency value $F_H$ and a fifth frequency value lower than the lower critical frequency value $F_L$. As mentioned above, the narrow temporary state pulse signals CLK1 at the high level are counted by the counter 115, and on the basis of the initial count value BIT[00], the counter 115 comprises the following counting steps in sequence as follows: when the first frequency value is lower than the lower critical frequency value $F_L$, the addition counter of the counter 115 is valid and 1 is added to the comparison result of the frequency comparator 114; when the second frequency value is greater than the upper critical frequency value $F_H$, the subtract counter of the counter 115 is valid and 1 is subtracted from the comparison result of the frequency comparator 114; when the third frequency value is lower than the lower critical frequency value $F_L$, the addition counter of the counter 115 is valid and 1 is added to the comparison result of the frequency comparator 114; when the fourth frequency value is greater than the upper critical frequency value $F_H$, the subtract counter of the counter 115 is valid and 1 is subtracted from the comparison result of the frequency comparator 114; and when the fifth frequency value is lower than the lower critical frequency value $F_L$, the addition counter of the counter 115 is valid and 1 is added to the comparison result of the frequency comparator 114. As a result, 1 is added to the initial count value BIT[00] three times and is subtracted for two times, thereby obtaining the total count value BIT[01]. In another embodiment, when the initial count value BIT[00], the lower critical count value BIT[00] and the upper critical value BIT[11] mentioned above are not changed, but the ranges of the five frequency values are changed, on the basis of the initial count value BIT[00], the counter 115 comprises the following counting steps implemented in sequence as follows: when the first frequency value is greater than the upper critical frequency value $F_H$, the subtraction counter of the counter 115 is valid and 1 is subtracted from the comparison result of the frequency comparator 114; when the second frequency value is greater than the upper critical frequency value $F_H$, the subtraction counter of the counter 115 is valid and 1 is subtracted from the comparison result of the frequency comparator 114; when the third frequency value is greater than the upper critical frequency value $F_H$, the subtraction counter of the counter 115 is valid and 1 is subtracted from the comparison result of the frequency comparator 114; when the fourth frequency value is greater than the upper critical frequency value $F_H$, the subtraction counter of the counter 115 is valid and 1 is subtracted from the comparison result of the frequency comparator 114; and when the fifth frequency value is greater than the upper critical frequency value $F_H$, the subtraction counter of the counter 115 is valid and 1 is subtracted from the comparison result of the frequency comparator 114. As a result, the total count value is less than the lower critical count value BIT[00], so that the final total count value is set of lower critical count value BIT[00]. In another contrary embodiment, as the initial count value BIT[00], the lower critical count value BIT[00] and the upper critical value BIT[11] mentioned above are not changed, but the ranges of the five frequency values are changed, on the basis of the initial count value BIT[00], the counter 115 comprises the following counting steps implemented in sequence as follows: when the first frequency value is lower than the lower critical frequency value $F_L$, the addition counter of the counter 115 is valid and 1 is added to the comparison result of the frequency comparator 114; when the second frequency value is lower than the lower critical frequency value $F_L$, the addition counter of the counter 115 is valid and 1 is added to the comparison result of the frequency comparator 114; when the third frequency value is lower than the lower critical frequency value $F_L$, the addition counter of the counter 115 is valid and 1 is added to the comparison result of the frequency comparator 114; when the fourth frequency value is lower than the lower critical frequency value $F_L$, the addition counter of the counter 115 is valid and 1 is added to the comparison result of the frequency comparator 114; and when the fifth frequency value is lower than the lower critical frequency value $F_L$, the addition counter of the counter 115 is valid and 1 is added to the comparison result of the frequency comparator 114. As a result, the total count value is greater than the upper critical count value BIT[11], so that the final total count value set as the upper critical count value BIT[11].

As shown in FIG. 9 and FIG. 10, the frequency values F of the temporary state pulse signal CLK1 is implemented during the preset time $T_{SET}$-A, and the total count value from the counter 115 is finally transmitted and encoded/burned into a register 116 for storage. The on-time $T_{ON2}$ during the preset time $T_{SET}$-B is adjusted relative to the on-time $T_{ON1}$ during the preset time $T_{SET}$-A, and the final total count value corresponding to the counting frequency value F is used as the basis for the adjustment of the on-time $T_{ON2}$. The adjustment of the on-time $T_{ON2}$ is illustrated in FIG. 9. As shown in FIG. 9, the on-time generator 105c mainly comprises a fixed current source 110, two optional auxiliary current sources 111 and 112, a third switch $SW_{51}$ and a capacitor $C_T$, and the fixed current source 110 and the two auxiliary current sources 111 and 112 are provided with a working voltage through a power supply voltage $V_{DD}$. The current $I_0$ outputted from the fixed current source 110 is directly transmitted to a node $N_T$ at one end of the capacitor $C_T$ to continuously charge the capacitor $C_T$, and the other end of the capacitor $C_T$ is connected with the ground terminal GND. Furthermore, a fourth switch $SW_{61}$ is connected between the auxiliary current source 111 and the node $N_T$ at one end of the capacitor $C_T$, where the current $I_1$ outputted from the auxiliary current source 111 is received through one end of the fourth switch $SW_{61}$, while the second end of the fourth switch $SW_{61}$ is connected with the node $N_T$. When the control end of the fourth switch $SW_{61}$ receives the high level signal, it is turned on, thus the capacitor $C_T$ can be charged through the current $I_1$ outputted from the auxiliary current source 111 at the node $N_T$. Similarly, a fifth switch $SW_{62}$ is connected between the other auxiliary current source 112 and node $N_T$ at one end of the capacitor $C_T$, and the current $I_2$ outputted from the auxiliary current source 112 is received at the first end of the fifth switch $SW_{62}$, while the second end is connected with the node $N_T$. When the control end of the fifth switch $SW_{62}$ receives the high level signal, it is turned on, thus the capacitor $C_T$ can be charged through the current I2 outputted from the auxiliary current source 112 at the node $N_T$. The first end of the third switch $SW_{51}$ is connected with the node $N_T$, and the second end is connected with the ground terminal GND, thus the third switch $SW_{51}$ is connected with the capacitor $C_T$ in parallel. The temporary state pulse signal CLK1 at high level generated at the rising-edge of the control signal SQ1 during the preset time $T_{SET}$-A in the one-shot trigger 105b is inputted into the control end of the third switch $SW_{51}$, thus the third switch $SW_{51}$ is turned on, and the capacitor $C_T$ is discharged at the node $N_T$ when the third switch $SW_{51}$ is turned on, so that the signal $S_{ON1}$ at the low level is generated by the output end of the third comparator A3. After the rising-edge of the control signal SQ1, the temporary state pulse signals CLK1 at the high level with narrow pulse turns back to the low level, and the fixed current source 110 starts to charge the capacitor $C_T$ at node $N_T$. Alternatively, if the fourth switch $SW_{61}$ is turned on, the auxiliary current source 111 and the fixed current source 110 together charge the capacitor $C_T$ at node $N_T$, and if the fifth switch $SW_{62}$ is turned on, the auxiliary current source 112 and the fixed current source 110 together charge the capacitor $C_T$. The on-time generator 105c is triggered by the temporary state pulse signal CLK1 generated by the one-shot trigger 105b to time the on-time $T_{ON1}$, and the signal $S_{ON1}$ generated by the third comparator A3 during the on-time $T_{ON1}$ when the master switch Q1 is turned on is continuously at the low level. While the capacitor $C_T$ is charged during the on-time $T_{ON1}$, the voltage at the node $N_T$ of the capacitor $C_T$ is greater than the third reference voltage $V_P$, and after the on-time $T_{ON1}$ is ended, the signal $S_{ON1}$ outputted from the third comparator A3 is converted to the high level during the off-time $T_{OFF1}$, and then the signal $S_{ON1}$ is inputted into the reset end R of the RS trigger 105a resting the RS trigger 105a. The control signal SQ1 generated at the output end Q can drop from the high level to the low level during the off-time $T_{OFF1}$, and then the master switch Q1 is turned off. If the detection voltage DE is still lower than the first reference voltage $V_{REF}$ after the first on-off period of the master switch Q1, a second on-off period is implemented for the master switch Q1, and the operation is repeated until the detection voltage DE is greater than the first reference voltage $V_{REF}$ when the preset time $T_{SET}$-A is ended. In such an on-off mode, the operation that the master switch Q1 is turned on during the on-time $T_{ON1}$ and is turned off during the off-time $T_{OFF1}$ is repeated for multiple times during the whole preset time $T_{SET}$-A.

The control signal SQ2 during the preset time $T_{SET}$-B and the signal CLK2 at the high level with narrow pulse at the rising-edge of the control signal SQ2 are generated from the second controller 105 based on the total count value of the counter 115 during the preset time $T_{SET}$-A. When the on-off frequency value f during the preset time $T_{SET}$-A is too low and the transformer T makes the sound, the final total count value of the counter 115 is greater than the preset initial count value, which is stored in the register 116. The binary code element written by the register 116 controls the fourth switch $SW_{61}$ and the fifth switch $SW_{62}$ turning on or off, and when the on-off frequency value f is too low and the total count value is greater than the initial count value, for example, the total count value is bit BIT[01], or BIT[11], then the total count value is greater than the code element BIT[00] of the initial count value.

As mentioned above, the total count value BIT [01] is used as the control signal of the fourth switch $SW_{61}$ and the fifth switch $SW_{62}$, where the on/off state of the fourth switch $SW_{61}$ is turned on through 0 of relatively high bit, and the fifth switch $SW_{62}$ is turned on through 1 of relatively low bit. Furthermore, the total count value BIT [11] is used as the control signal of the fourth switch $SW_{61}$ and the fifth switch $SW_{62}$, in which the fourth switch $SW_{61}$ is turned on through 1 of relatively high bit, and the fifth switch $SW_{62}$ is turned on through 1 of relatively low bit. A schematic diagram of the on-time generator 105c is illustrated in FIG. 9 as an example, however, other content well-known in the art with the control signal data of the register decoded by a decoder in advance to subsequently turn on or turn off corresponding switches through a group of decoding signals can also be implemented.

When the detection voltage DE is lower than the first reference voltage $V_{REF}$ during the preset time $T_{SET}$-B, and when the third switch $SW_{51}$ is turned on as the temporary state pulse signal CLK2 is at the high level with narrow pulse triggered by the rising-edge of the control signal SQ2 during the preset time $T_{SET}$-B, the capacitor $C_T$ is discharged at node $N_T$ through the third switch $SW_{51}$, so that the signal $S_{ON2}$ at the low level is generated at the output end of the third comparator A3. After the rising-edge of the control signal SQ2, the temporary state pulse signals CLK2 at the high level with narrow pulse drops back to the low level, and the fixed current source 110 starts to charge the capacitor $C_T$ at node $N_T$. Alternatively, if the fourth switch $SW_{61}$ is turned on, the auxiliary current source 111 and the fixed current source 110 together charge the capacitor $C_T$, and if the fifth switch $SW_{62}$ is turned on, the auxiliary current source 112 and the fixed current source 110 together charge the capacitor $C_T$. The fourth switch $SW_{61}$ is controlled to be turned off, and the fifth switch $SW_{62}$ is thus turned on by the total count value BIT[01] of the register 116, so that the current $I_2$ outputted from the auxiliary current source 112 and the current $I_0$ outputted from the fixed current source 110 are directly transmitted to the node $N_T$ at one end of the capacitor $C_T$ to charge the capacitor $C_T$. As a result, the charge speed is relatively fast with the combination of the current $I_0$ and $I_2$ comparing with that with the single current $I_0$, as such the capacitor $C_T$ is rapidly fully charged in the preset time $T_{SET}$-B comparing to that in the preset time $T_{SET}$-A. Similarly, the fourth switch $SW_{61}$ and the fifth switch $SW_{62}$ are controlled to be turned on by the total count value BIT[11] of the register 116, and the current $I_1$ outputted from the auxiliary current source 111, the current $I_2$ outputted from the auxiliary current source 112 and the current $I_0$ outputted from the fixed current source 110 are directly transmitted to the node $N_T$ at one end of the capacitor $C_T$ to charge the capacitor $C_T$. As a result, the charge speed is relatively fast with the combination of the current $I_0$, $I_1$ and $I_2$ comparing with that of the single current $I_0$, so that the capacitor $C_T$ can be rapidly fully charged in the preset time $T_{SET}$-B relative to that in the preset time $T_{SET}$-A. The on-time generator 105c is triggered by the temporary state pulse signal CLK2 generated by the one-shot trigger 105b to time the on-time $T_{ON2}$, and the signal $S_{ON2}$ generated by the third comparator A3 is continuously at the low level during the on-time $T_{ON2}$ when the master switch Q1 is turned on. While the capacitor $C_T$ is continuously charged during the turn-on time $T_{ON2}$, the voltage of the capacitor $C_T$ starts to be greater than the third reference voltage $V_P$. After the turn-on time $T_{ON2}$ is ended, the signal $S_{ON2}$ is converted to the high level during the turn-off time $T_{OFF2}$ and is further inputted into the reset end R to reset the RS trigger 105a, thus the control signal SQ2 generated by the output end Q drops back from the high level to the low level during the turn-off time $T_{OFF2}$, and then the master switch Q1 is turned off. If the detection voltage DE of the master switch Q1 is still lower than the first reference voltage $V_{REF}$ after the first on-off period, a second on-off period is implemented for the master switch Q1, and the operation is repeated until the detection voltage DE is greater than the first reference voltage $V_{REF}$ after the preset time $T_{SET}$-B is ended. In the on-off mode, the operation that the master switch Q1 is turned on in the on-time $T_{ON2}$ and is turned off in the off-time $T_{OFF2}$ can be repeated for multiple times in the whole preset time $T_{SET}$-B.

As mentioned above, the current source 111 and/or current source 112 is not provided in the preset time $T_{SET}$-A, but the current source 111 and/or current source 112 is provided in the preset time $T_{SET}$-B. As a result, the charge speed of the capacitor $C_T$ is relatively fast because the total current during the on-time $T_{ON2}$ of the preset time $T_{SET}$-B is larger, so that it takes shorter time for the voltage at the node $N_T$ being greater than the third reference voltage $V_P$, and thus the on-time $T_{ON2}$ is shorter than the on-time $T_{ON1}$. Considering that the on-off frequency value f of the master switch Q1 is reduced as the on-time $T_{ON}$ increases and is increased as the on-time $T_{ON}$ decreases. As such, when the load 18 is a light load or empty load, the on-off frequency value f in the on-time $T_{ON1}$ is increased when the on-time $T_{ON2}$ is reduced, and thus the transformer T can be prevented from making a sound.

Actually, the relative amounts of the on-time $T_{ON1}$ and the turn-on time $T_{ON2}$ are closely associated with the initial count value of the counter 115. For example, if the initial count value of the counter 115 in the preset time $T_{SET}$-A is BIT[01] or BIT[10], one of the fourth switch $SW_{61}$ and the fifth switch $SW_{62}$ is turned on and the other one is turned off, then the capacitor $C_T$ is charged by the current $I_1$ outputted from the auxiliary current source 111 or the current $I_2$ outputted from the auxiliary current source 112 together with the current $I_0$ of the fixed current source 110 in the on-time $T_{ON1}$, i.e., the total charge current is $(I_1+I_0)$ or $(I_2+I_0)$. On the basis of the initial count value, for example BIT[01], the counter 115 operates with the following counting steps with different frequency values as follows: when the first frequency value is greater than the upper critical frequency value $F_H$, the subtraction counter of the counter 115 is valid and 1 is subtracted from the comparison result of the frequency comparator 114; when the second frequency value is lower than the lower critical frequency value $F_L$, the addition counter of the counter 115 is valid and 1 is added to the comparison result of the frequency comparator 114; when the third frequency value is greater than the upper critical frequency value $F_H$, the subtraction counter of the counter 115 is valid and 1 is subtracted from to the comparison result of the frequency comparator 114; when the fourth frequency value is lower than the lower critical frequency value $F_L$, the addition counter of the counter 115 is valid and 1 is added to the comparison result of the frequency comparator 114; and when the fifth frequency value is greater than the upper critical frequency value $F_H$, the subtraction counter of the counter 115 is valid and 1 is subtracted from the comparison result of the frequency comparator 114. When the final count value is BIT[00] and the total charge current of the capacitor $C_T$ is I0 in the turn-on time $T_{ON2}$, the total charge time of the capacitor $C_T$ in the on-time $T_{ON2}$ is greater than that in the on-time $T_{ON1}$, equivalently, the on-time $T_{ON2}$ is adjusted to be greater than the on-time $T_{ON1}$, and thus the on-off frequency value f can be adjusted to a small value in the preset time $T_{SET}$-B from a large value in the preset time $T_{SET}$-A.

In the summary, the control signal SQ1 of the second controller 105 of the secondary winding is transmitted to the first controller 104 of the primary winding through the coupling element 106 in the preset time $T_{SET}$-A as shown in FIG. 10, so that the first pulse signal $S_1$ generated by the first controller 104 is enabled to control the master switch Q1 turning on during on-time $T_{ON1}$ in the on-off period. As shown in FIG. 10, the control signal SQ2 of the second controller 105 of the secondary winding is transmitted to the first controller 104 of the primary winding through the coupling element 106 in the preset time $T_{SET}$-B, so that the first pulse signal $S_1$ generated by the first controller 104 is enabled to control the master switch Q1 turning on during on-time $T_{ON2}$ in the on-off period. When the final total count value obtained by calculating the number of the frequency values F of the CLK1 triggered by the rising-edge of the control signal SQ1 by the counter 115 in the preset time $T_{SET}$-A is greater than the initial count value, the on-time $T_{ON2}$ during the preset time $T_{SET}$-B is less than the on-time $T_{ON1}$. Vice versa, when the final total count value is less than the initial count value, the on-time $T_{ON2}$ during the preset time $T_{SET}$-B is greater than the on-time $T_{ON1}$. When the final total count value is equal to the initial count value, the on-time $T_{ON2}$ during the preset time $T_{SET}$-B is equal to the on-time $T_{ON1}$. The reason is that when the detection voltage DE is lower than the first reference voltage $V_{REF}$, the total count value can be updated once, and whether the switches $SW_{61}$ and $SW_{62}$ are turned on or not is directly determined by the code element in the total count value, therefore, when the detection voltage DE is lower than the first reference voltage $V_{REF}$ in a latter time, the on-time is determined by the total count value of the previous time. In the present invention, the code elements only includes two bits and the two extra auxiliary current sources 111 and 112 are provided for example, in practical topology, the initial count value, the upper critical count value and the lower critical count value are not limited by only two bits code elements of two bits, and the number of the auxiliary current sources is not limited by only two currents.

The above embodiments describe the structure and operation mechanism of the voltage converters using the first pulse signal $S_1$ driving the master switch Q1 to switch on/off and the second pulse signal $S_2$ driving the synchronous switch Q2 to switch on/off.

In the present invention, a data transmission medium between the first and second controllers 104 and 105, i.e., the coupling element 106, is very important. In one example, the coupling element 106 includes a pulse transformer PT, and the structure of the pulse transformer PT is described in FIG. 11A to FIG. 13C.

Figure 11B:
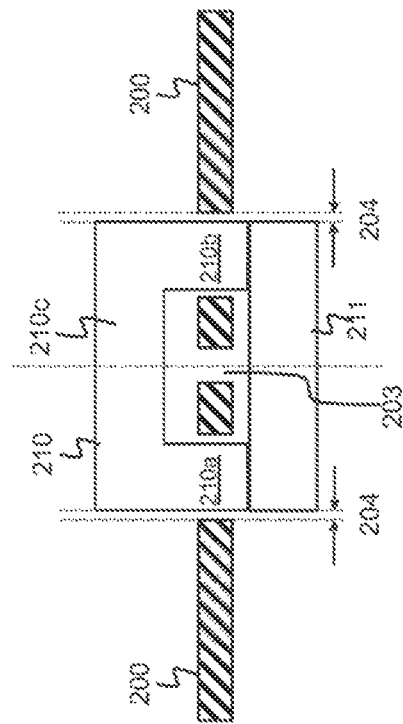
FIGS. 11A-11B are schematic diagrams illustrating the structure of a pulse transformer according to a first embodiment.
Figure 11A:
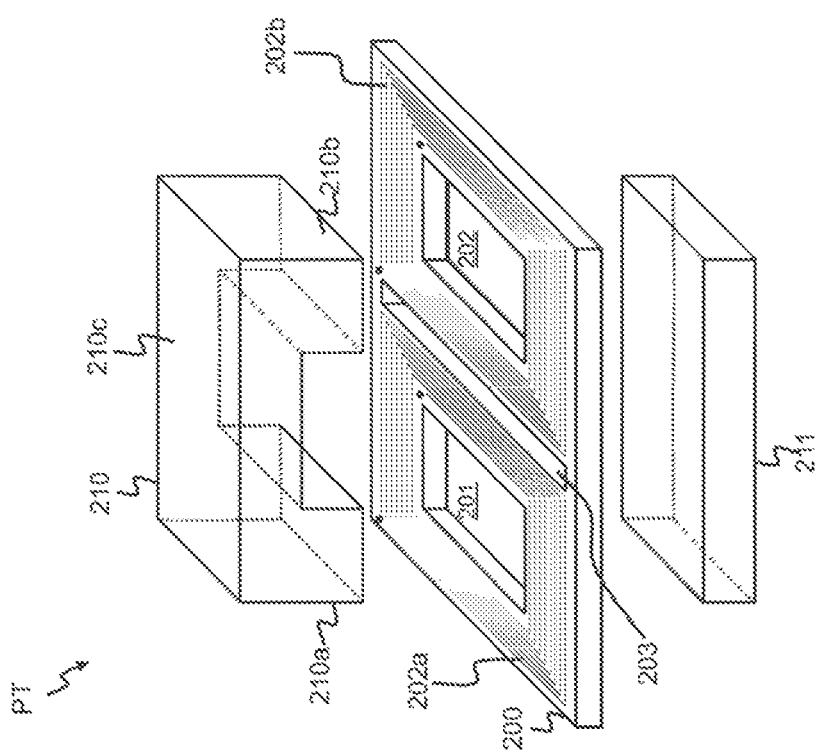

As shown in FIG. 11A, a pulse transformer PT of the voltage converter, which is only a portion of a whole PCB includes a circuit board 200 with all the electronic devices surface-mounted to the circuit board. A first through hole 201 and a second through hole 202 penetrating through the thickness of the circuit board 200 are formed side by side on the circuit board 200 by drilling, etching or laser cutting and the likes. A strip-shaped gap 203 penetrating through thickness of the circuit board 200 is optionally formed in the region of the circuit board 200 between the first through hole 201 and the second through hole 202. Optionally, the first through hole 201 and the second through hole 202 are symmetrically disposed at the two opposite sides of the gap 203 by taking the gap 203 as the central symmetric line, and the first through hole 201 and the second through hole 202 can be squares. A helical coil 202a is formed around the first through hole 201 on the surface of the circuit board 200 serving as a primary winding of the pulse transformer PT. The helical coil 202a includes multiple concentric square conducting rings surrounding the first through hole 201, and each of the conducting rings are placed on the same plane of the circuit board 200. The central position of the helical coil 202a and the central position of the first through hole 201 are approximately overlapped. Similarly, another helical coil 202b is formed around the second through hole 202 on the same surface of the circuit board 200 serving as a secondary winding of the pulse transformer PT. The helical coil 202b includes multiple concentric square conducting rings surrounding the second through hole 202, and each of the conducting rings are placed on the same plane of the circuit board 200. The central position of the helical coil 202b and the central position of the second through hole 202 are approximately overlapped. The helical coil 202a has a head end and a tail end. Similarly, the helical coil 202b has a head end and a tail end. In one embodiment, the multiple concentric square conducting rings of the helical coil 202a can be formed by forming a helical shallow trench on the upper surface or the lower surface of the circuit board 200 surrounding the first through hole 201 including a plurality of concentric square grooves from inside to outside filled with conducting materials, for example, metal copper or the like. Similarly, the multiple concentric square conducting rings of the helical coil 202b can be formed by forming a helical shallow trench on the upper surface or the lower surface of the circuit board 200 surrounding the second through hole 202 filled with conducting materials. In other embodiments, the helical coil 202a or 202b can be formed by directly mounting a series of multiple concentric square metal coils to the upper surface of the circuit board 200 by adhering, depositing, sputtering, electroplating and the like; for example, they are made by plating metal wiring or wire TRACE on the circuit board 200. In one embodiment shown in FIG. 11A, the helical coil 202a or 202b is a square. However, the coils of the helical coil 202a or 202b may also be a series of concentric rings or various polygon shapes and the like (not shown). As shown FIG. 11A, the helical coil 202a or 202b includes only a single layer, however, in other embodiments, the helical coil 202a includes stacked multi-layer helical coils such that the helical coils at different layers are disposed in separated planes parallel with each other surrounding the first through hole 201 (not shown). Similarly, the helical coil 202b can include stacked multi-layer helical coils, such that the helical coils at different layers are disposed in separated planes parallel with each other surrounding second through hole 202 (not shown). In the multilayer helical coil structure, the helical coils at different layers are electrically isolated by an insulating layer laminated between two helical coil layers but any two adjacent helical coils need to interconnect as follows: the second end (or ending end) of one helical coil and the first end (or beginning end) of the following adjacent helical coil need to be electrically connected through an interconnection wire connecting these multilayer helical coils in series. For example, in the multilayer helical coil, the first end (or the beginning end) of the first helical coil in the topmost layer is served as one terminal of the series structure of a plurality of helical coils, and the ending end of the last helical coil in the bottommost layer is served as the other terminal of the series structure of the plurality of helical coils.

As shown in FIG. 11A, the pulse transformer PT includes a U-shaped magnetic core 210 and a stripe-shaped magnetic core 211. The magnetic core 210 includes two side portions 210a and portion 210b extending in two parallel planes and a middle portion 210c perpendicular to the side portions 210a and 210b with each of the side portions 210a and 210b respectively connected to each end side of the middle portion 210c. Substantively, both side portions 210a and 210b and the middle portion 210c are integrated in one piece forming U-shaped magnetic core 210. The side portion 210a of the U-shaped magnetic core 210 is inserted into the first through hole 201 while the side portion 210b of the U-shaped magnetic core skeleton 210 is accordingly inserted into the second through hole 202, so that the magnetic core 210 is mounted on the circuit board 200. Furthermore, in order to form a closed magnetic circuit loop, the magnetic core 211 also needs to be attached with the magnetic core 210. In FIG. 11B, the magnetic core 210 is inserted from the front side of the circuit board 200, while the respective front end faces of the two side portions 210a and 210b of the magnetic core 210 are tightly attached to one surface of the magnetic core 211 on the other side of the circuit board 200, thus building the magnetic circuit. A gap 204 is reserved between the side face of one side portion 210a of the magnetic core 210 and the side wall of the first through hole 201 and between the side face of the side portion 210b of the magnetic core 210 and the side wall of the second through hole 202. In FIG. 11B, since the magnetic core 210 and the magnetic core 211 are attached together. It is possibly to break the magnetic cores 210 and 211 from the circuit board 200 if the electronic device with the pulse transformer PT built-in is shook or falls off. Preferably, some insulating glue is applied on the circuit board 200 to glue or firmly hold the magnetic cores 210 and 211 on the circuit board 200 without shifting. The printed circuit board 200 is used to mount the transformer T, a chip package integrated with the first controller 104 and a chip package integrated with the second controller 105 or the like, as such certain regions for those devices on the circuit board 200 are reserved before forming the first through hole 201 and the second through hole 202. The master switch Q1 and the synchronous switch Q2 may be externally mounted on the PCB circuit board 200, or the master switch Q1 and the first controller 104 may be integrated in one chip package and then mounted on the PCB circuit board 200, and/or the synchronous switch Q2 and the second controller 105 are integrated in one chip package and then mounted on the PCB circuit board 200.

Figure 12B:
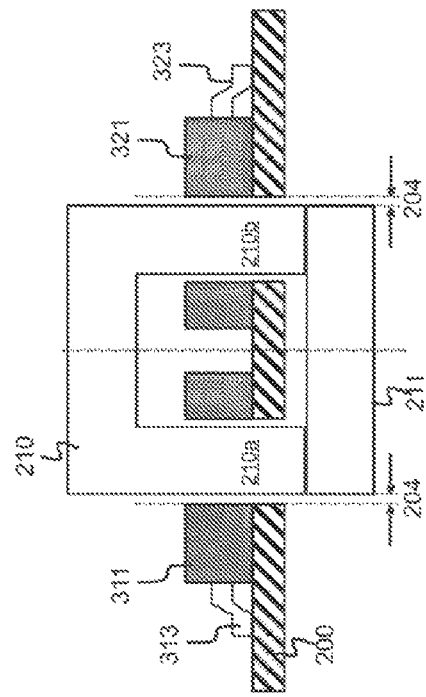
FIGS. 12A-12E are schematic diagrams illustrating the structure of a pulse transformer according to a second embodiment.
Figure 12A:
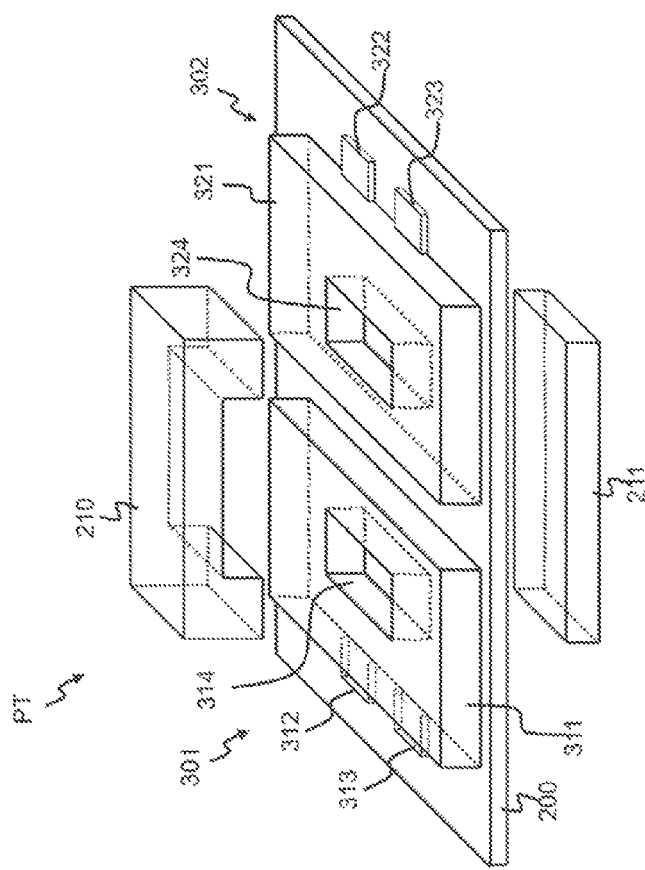

FIG. 12A shows another structure of the pulse transformer PT, which also includes the U-shaped magnetic core 210, a rectangular or square magnetic core 211, a first chip package 301 and a second chip package 302 instead of the helical coils 202a and 202b shown in FIG. 11A. The flat square first chip package 301 includes a first central hole 314 penetrating through the thickness of the first chip package 301 on a position relatively close to the central position and at least two pins 312 and 313 configured for butt-welding with a pad on the circuit board 200, for example, by the tin welding surface placement technology. The flat square second chip package 302 includes a second central hole 324 penetrating through the thickness of the second chip package 302 on a position relatively close to the central position and at least two pins 322 and 323 configured for butt-welding with a pad on the circuit board 200. In this embodiment, the adjacent first through hole 201 and second through hole 202 are also formed on the circuit board 200. When the first chip package 301 and second chip package 302 are mounted on the circuit board 200, the first central hole 314 and the second central hole 324 are aligned with the first through hole 201 and second through hole 202 of the circuit board 200 respectively. The first central hole 314 and the second central hole 314 are overlapped with the first through hole 201 and the second through hole respectively, as such the side portion 210a of the U-shaped magnetic core 210 is easily to insert through the first central hole 314 and the first through hole 201 and the side portion 210b of the U-shaped magnetic core 210 accordingly inserts through the second central hole 324 and the second through hole 202. In FIG. 12B, the magnetic core 211 and the magnetic core 210 are attached together, where the magnetic core 210 is inserted from the front side of the circuit board 200, while the respective front end faces of two side portions 210a and 210b of the magnetic core 210 are tightly jointed with one surface of the magnetic core skeleton 211 on the other side of the circuit board 200, thus building the magnetic circuit. As shown in FIG. 12B, a gap 204 also is reserved between the side face of one side portion 210a of the magnetic core 210 and the respective side walls of the first through hole 201 and the first central hole 314, and gap 204 is also reserved between the side face of another side portion 210b of the magnetic core 210 and the respective side walls of the second through hole 202 and the second central hole 324.

Figures 2, 12C:
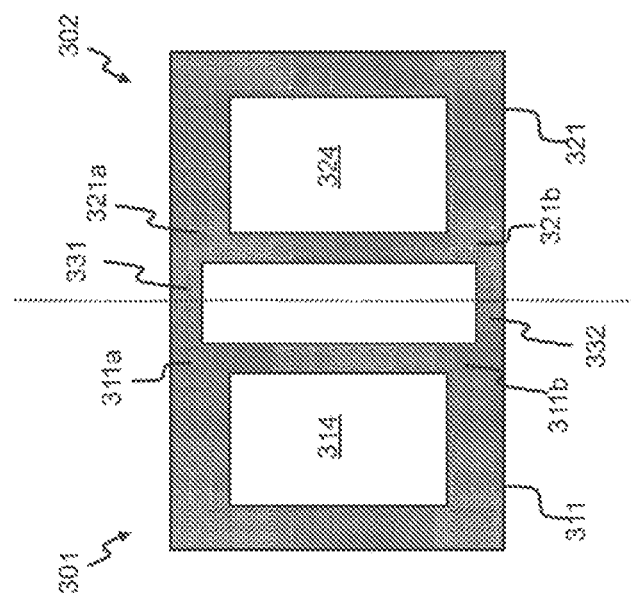
Figures 1, 12C:
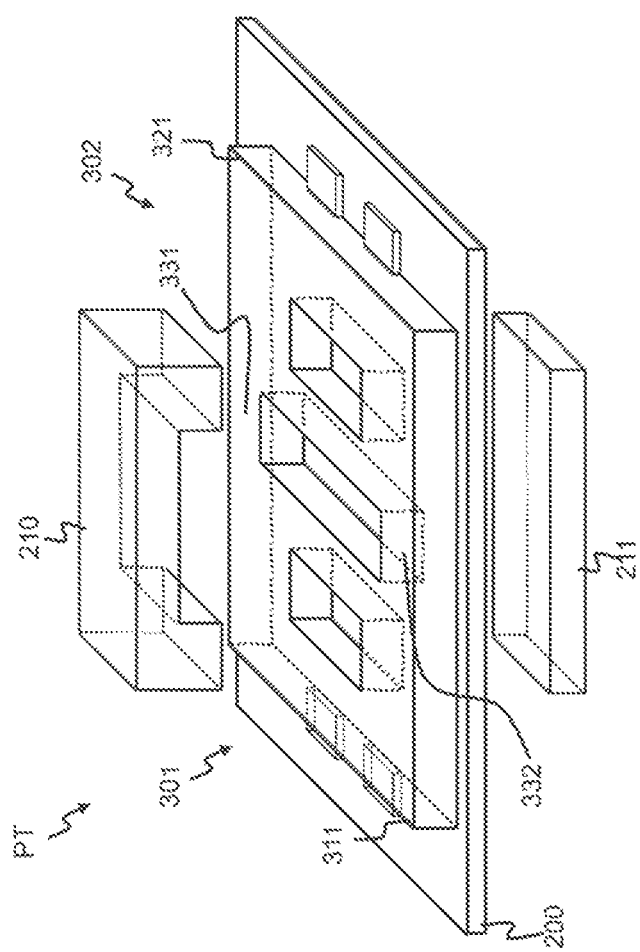

In the embodiment of FIG. 12A, both the first chip package 301 and the second chip package 302 are independent chips and attached on the circuit board 200 separately. In the embodiment of FIG. 12C-1, the first chip package 301 and the second chip package 302 are integrated in one piece that is mounted on the circuit board 200. In the top view of FIG. 12C-2, the first chip package 301 and the second chip package 302 are arranged side by side, where one corner portion 311a of the first chip package 301 and one corner portion 321a of the second chip package 302 are close to each other, and the two chips are connected together through a connecting portion 331. Another corner portion 311b of the first chip package 301 and another corner portion 321b of the second chip package 302 are close to each other, and the two chip packages are connected together through a connecting portion 332. Alternatively, the connecting portions 331 and 332 may be in other positions between the first and second chip packages as long as the interconnected first chip package 301 and second chip package 302 are substantially coplanar and can be synchronously mounted on the circuit board 200.

Figure 12D:
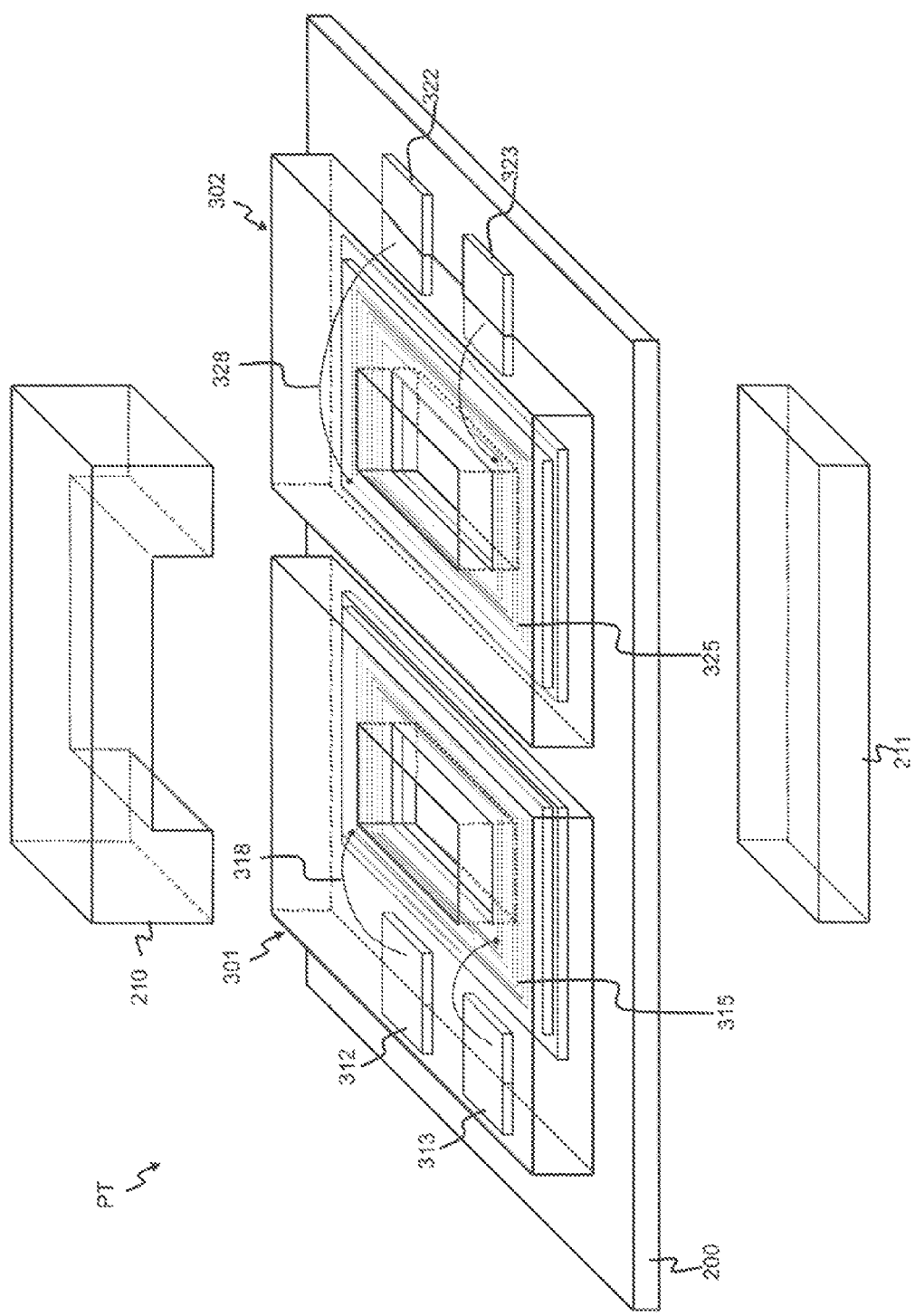
Figure 12E:
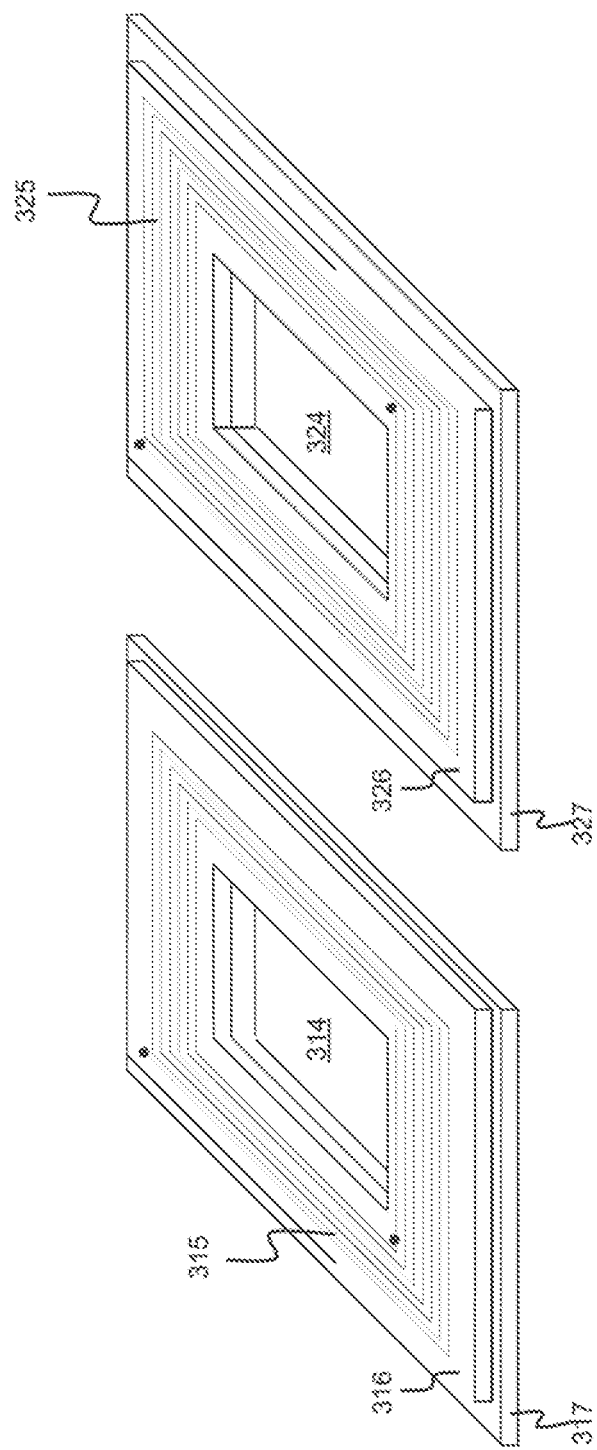

FIG. 12D is a perspective view of the structure shown in FIG. 12A with the wiring. The first chip package 301 includes a helical wiring 315 while the second chip package 302 includes a helical wiring 325, and the shapes of the helical wirings 315 and 325 are shown in FIG. 12E for an example. In FIG. 12E, one base plate 317 is optionally used to support one silicon substrate 316, however the substrate 316 can also be used solely. Each of the base plate 317 and the substrate 316 include a hole at the respective central position. The helical wiring 315 is formed on the upper surface of the substrate 316 surrounding the central holes of the substrate 316 and/or the base plate 317. Because the helical wiring 315 is a conductor, the helical wiring 315 is electrically insulated from the substrate 316 by an insulating layer. Similarly, another substrate 326 arranged side by side with the substrate 316 and is optionally supported by one base plate 327, but the substrate 326 may be used solely. Each of the base plate 327 and the substrate 326 include a hole at the respective central position. The helical wiring 325 is formed on the upper surface of the substrate 326 surrounding the central holes of the substrate 326 and/or base plate 327. Because the helical wiring 325 is a conductor, the helical wiring 325 is electrically insulated from the substrate 326 through an insulating layer. The base plates 317 and 327 can be a metal lead frame and the like. In FIG. 12E, the helical wiring 315 or 325 is only a single-layer, however, in other embodiments, the helical wiring 315 or 325 can be stacked multilayer helical wirings formed on the substrate 316 or 326, so that the helical wirings at different layers are arranged in planes parallel to each other and surrounding the central hole 314 or 324. The helical coils at different layers in the multilayer helical coils are electrically insulated by a dielectric layer (for example, silicon dioxide, and the like), but any two adjacent helical coils are interconnected as follows: the second end (or the ending end) of one helical coil and the first end (or beginning end) of the following adjacent helical coil are electrically connected through an interconnection wire, as such these multilayer helical coils are connected in series. In addition, the first end (or the beginning end) of the first helical coil in the topmost layer is served as one terminal of the series of the plurality of helical coils, and the second end (or the ending end) of the last helical coil in the bottommost layer is served as another terminal of the series of the plurality of helical coils.

As shown in FIG. 12D, the first chip package 301 has a plastic package body 311, and the second chip package 302 has a plastic package body 321. In the first chip package 301, the plastic package body 311 encapsulates the substrate 316 and/or base plate 317 and the helical wiring 315 formed on the upper surface of the substrate 316 therein. A lead 318, which is formed for example by wire bonding, connects one end of the helical wiring 315 and the pin 312 formed on the substrate 316, and another lead 318 connects the other end of the helical wiring 315 and the pin 313 formed on the substrate 316. The leads 318 are also encapsulated inside the plastic package body 311. A portion of each of the pins 312 and 313 connecting to the lead 318 is coated by the plastic package body 311, but another portion of each of the pins 312 and 313 is extending out of the plastic package body 311 for butt-welding with the pads on the circuit board 200. Similarly, in the second chip package 302, the plastic package body 321 encapsulates the substrate 326 and/or the base plate 327 and the helical wiring 325 formed on the upper surface of the substrate 326. A lead 328, which is also formed by wire bonding, connects one end of the helical wiring 325 and the pin 322 formed on the substrate 326, and another lead 328 connects the other end of the helical wiring 325 and the pin 323 formed on the substrate 326. Similarly, the lead 328 is also encapsulated inside the plastic package body 321. A portion of each of the pins 322 and 323 connecting to the lead 318 are encapsulated by the plastic package body 311, but another portion of each of the pins 322 and 323 is extending out of the plastic package body 311 respectively for butt-welding with the pad formed on the circuit board 200. The plastic package bodies 311 and 321 can be made of materials like epoxy resin.

As shown in FIG. 12D, in the first chip package 301, the first central hole 314 penetrates through the thicknesses of the plastic package body 311, the substrate 316 and/or base plate 317 and is substantially located at the central positions of the plastic package body 311, the substrate 316 and/or base plate 317. The helical wiring 315, or the series of concentric square conducting rings, surround the first central hole 314 is served as the primary winding of the pulse transformer PT. Similarly, in the second chip package 302, the second central hole 324 penetrates through the thicknesses of the plastic package body 321, the substrate 326 and/or the base plate 327 and is substantially located at the central positions of the plastic package body 321, the substrate 326 and/or the base plate 327. The helical wiring 325, or the series of concentric square conducting rings, surround the second central hole 324 is served as the secondary winding of the pulse transformer PT. With respect to the embodiments in FIG. 12C-1 and FIG. 12C-2, in the MOLDING step, the plastic package body 311 of the first chip package 301 and the plastic package body 321 of the second chip package 302 are synchronously and integrally molded in one whole piece. One corner portion 311a of the plastic package body 311 and one corner portion 321a of the plastic package body 321 are close to each other and are connected together through a connecting portion 331. Another corner portion 311b of the plastic package body 311 and one corner portion 321b of the plastic package body 321 are close to each other and are connected together through a connecting portion 332. In the embodiment of FIG. 11B, a strip-shaped gap 203 may or may not be prepared in between the first through hole 201 and the second through hole 202 on the circuit board 200. In the embodiments of FIG. 12A to FIG. 12E, the middle portion 210c of the magnetic core 210 and the magnetic core 211 are parallel to the respective planes of the first chip package 301, the second chip package 302, and the circuit board 200, thus the side portion 210a and the side portion 210b of the magnetic core 210 are perpendicular to the respective planes of the first chip package 301, the second chip package 302, and the circuit board 200. When the first chip package 301 and the second chip package 302 are mounted on the circuit board 200, the substrate 316 and/or the base plate 317, the substrate 326 and/or the base plate 327, as well as the plastic package bodies 311 and 321 are all parallel with the circuit board 200.

Figure 13A:
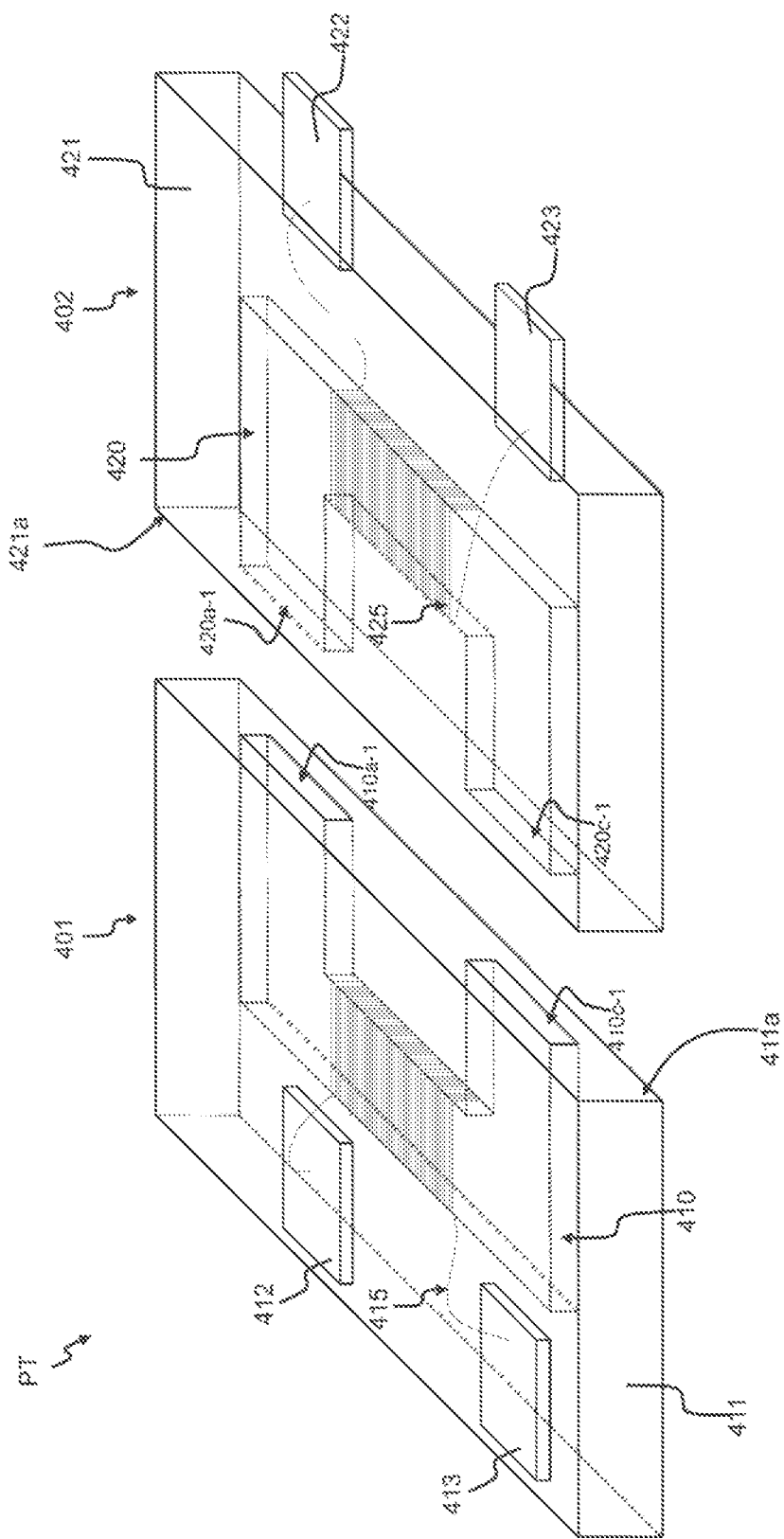
FIGS. 13A-13C are schematic diagrams illustrating the structure of a pulse transformer according to a third embodiment.
Figure 13B:
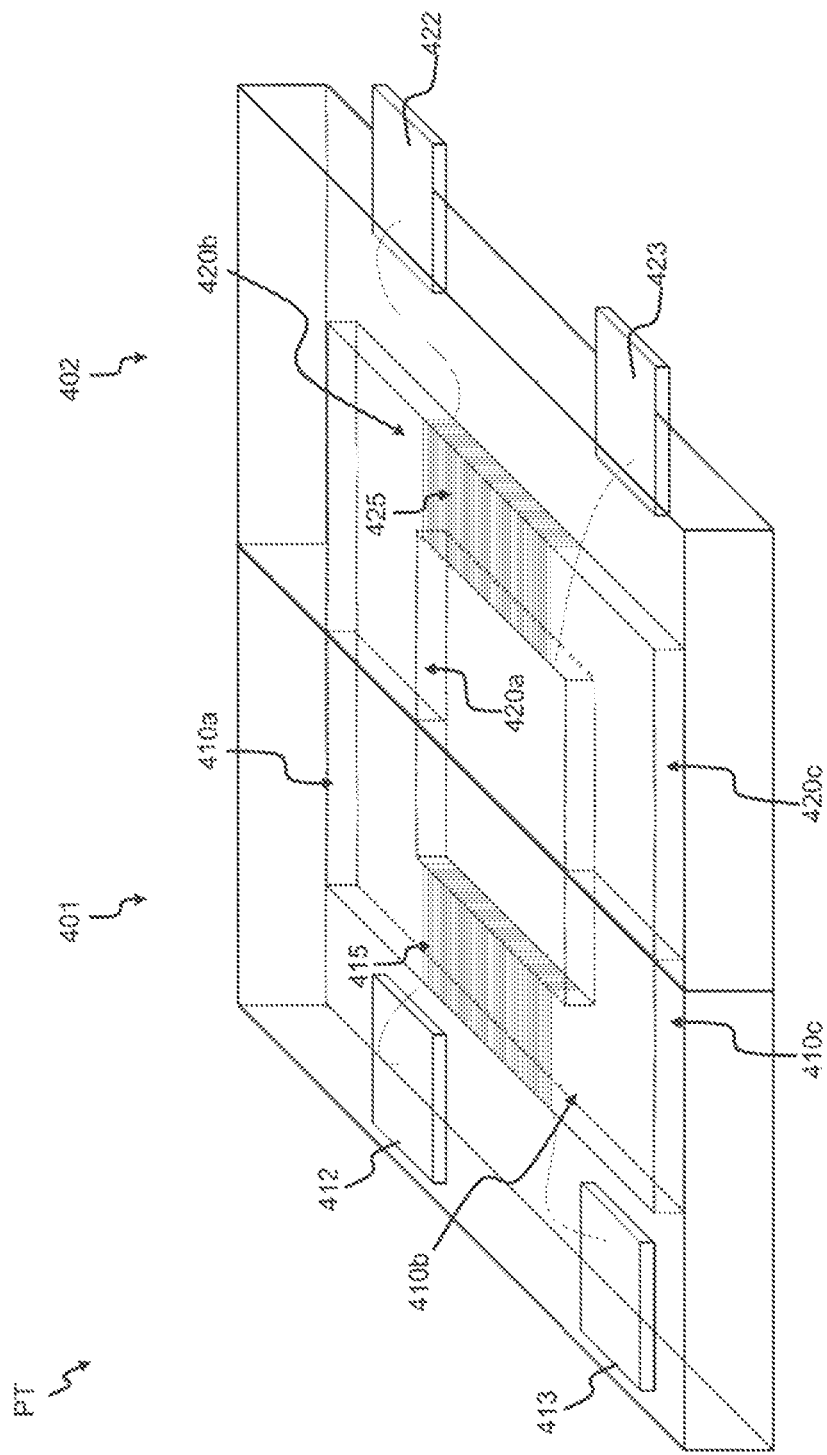
Figure 13C:
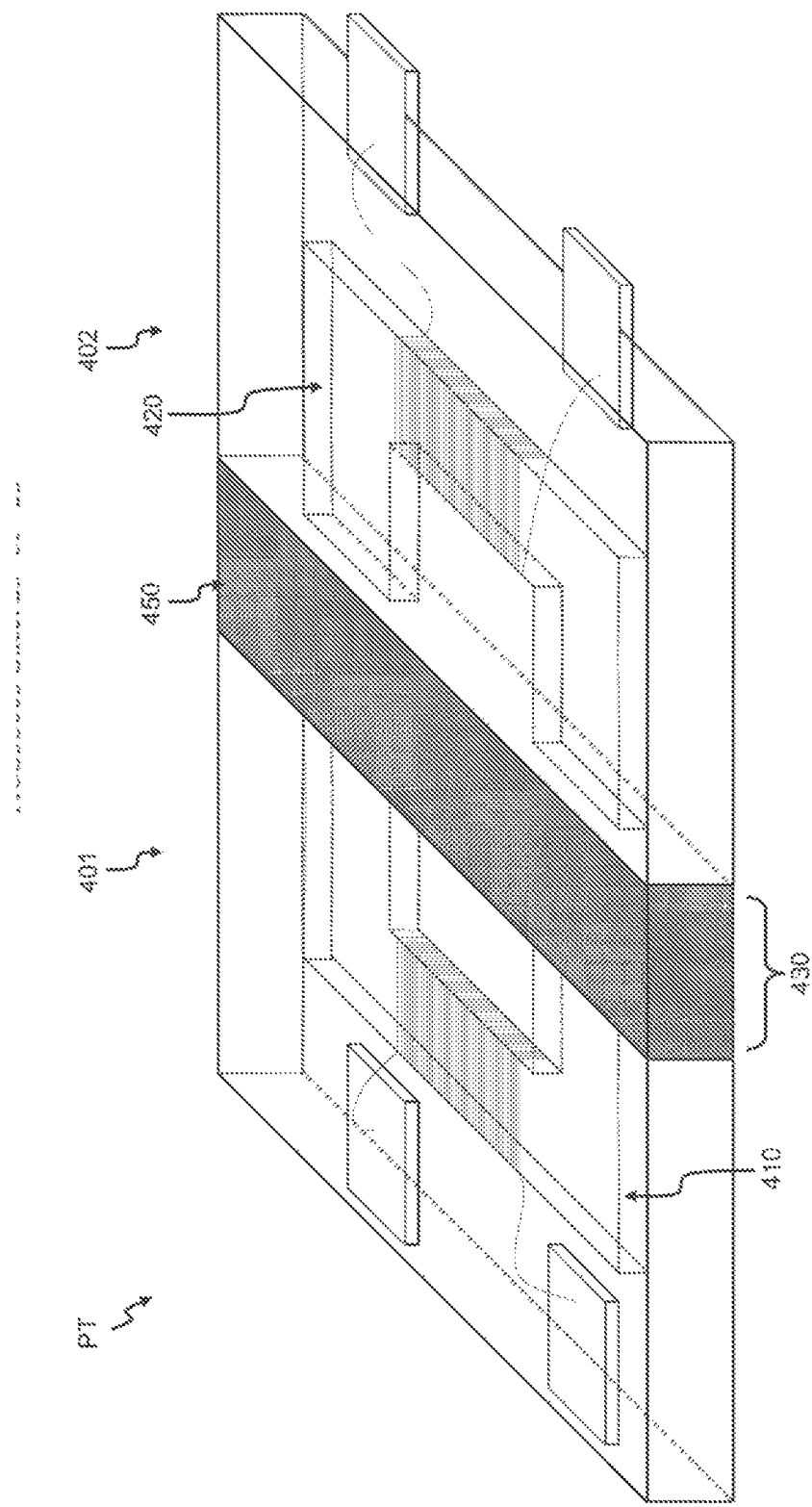

FIG. 13A shows another structure of the pulse transformer PT including a first chip package 401 having a U-shaped magnetic core 410 and a second chip package 402 having a U-shaped magnetic core 420. In the first chip package 401, as shown in FIG. 13B, the magnetic core 410 includes a side portion 410a and a side portion 410c parallel to each other and a middle portion 410b perpendicular to and connecting the side portions 410a and 410c. One first coil 415 is wound around the middle portion 410b and is electrically connected with a pin 412 directly at one with a pin 413 directly at the other end, where the pins 412 and 413 are adjacent to the magnetic core 410. The plastic package body 411 encapsulates the magnetic core 410 and the first coil 415, in which a portion of the pin 412 connecting to the first coil winding 415 is encapsulated by the plastic package body 411, but another portion of the pin 412 is extending out of the plastic package body 411 for butt-welding with a pad on the circuit board 200. Similarly, a portion of the pin 413 connecting to the first coil winding 415 is encapsulated by the plastic package body 411, but another portion of the pin 413 is extending out of the plastic package body 411 for butt-welding with a pad on the circuit board 200. In the second chip package 402, as shown in FIG. 13B, the magnetic core 420 includes a side portion 420a and a side portion 420c parallel to each other, and a middle portion 420b perpendicular to and connecting the side portions 420a and 420c together. One second coil 425 is wound around the middle portion 420b having one end of the second coil 415 electrically connected with a pin 422 directly and the other end of the second coil winding 425 electrically connected with a pin 423 directly, where the pins 422 and 423 are adjacent to the magnetic core 420. The plastic package body 421 encapsulates the magnetic core 420 and the second coil 425. A portion of the pin 422 connecting to the second coil winding 425 is encapsulated by the plastic package body 421, but the other portion of the pin 422 is extending out of the plastic package body 421 for butt-welding with the pad on the circuit board 200. Similarly, a portion of the pin 423 connecting to the second coil winding 425 is encapsulated by the plastic package body 421, but another portion of the pin 423 is extending out of the plastic package body 421 for butt-welding with the pad on the circuit board 200. In the embodiments of FIG. 13A to FIG. 13C, the middle portion 410b and the side portions 410a and 410c of the magnetic core 410 are coplanar and parallel to the plane of the first chip package 401, and the middle portion 420b and the side portions 420a and 420c of the magnetic core 420 are coplanar and parallel to the plane of the second chip package 402. Moreover, when the first chip package 401 and the second chip package 402 are mounted on the circuit board 200 side by side, the magnetic core 410, the magnetic core 420 and the corresponding plastic package bodies 411 and 421 are all parallel with the circuit board 200.

As shown in FIG. 13A, the front end faces 410a-1 and 410c-1 of the side portion 410a and 410c of the magnetic core 410 are required to be exposed from the side face 411a of the plastic package body 411. The front end faces 410a-1 and 410-c are actually the cutting faces of the side portions 410a and 410c and perpendicular to the length direction of the side portions 410a and 410c respectively. Similarly, the front end faces 420a-1 and 420c-1 of the side portions 420a and 420c of the magnetic core 420 are required to be exposed from the side faces 421a and 421c of the plastic package body 421. The front end faces 420a-1 and 420c-1 are actually the cutting faces of the side portion 420a and 420c and perpendicular to the length direction of the side portions 420a and 420c. When the pulse transformer PT is used, the side face 411a of the plastic package body 411 and the side face 421a of the plastic package body 421 are facing to each other to enable the front end faces 410a-1 and 410c-1 of the side portion 410a of the magnetic core 410 to be aligned and contacted with the front end faces 420a-1 and 420c-1 of the side portion 420a of the magnetic core 420 respectively, thus forming a closed magnetic core circuit between the two magnetic cores 410 and 420 along the side portion 410a of the magnetic core 410 to the side portion 420a of the magnetic core 420 and along the side portion 420c of the magnetic core 420 to the side portion 410c of the magnetic core 410.

FIG. 13B shows a closed structure of the pulse transformer PT of FIG. 13A. When the first chip package 401 and the second chip package 402 are mounted on the circuit board 200 close to each other with the side face 411a of the plastic package body 411 of the first chip package 401 in contact with one side face 421a of the plastic package body 421 of the second chip package 402, as such the front end face 410a-1 of the side portion 410a of the magnetic core 410 and the front end face 420a-1 of the side portion 420a of the magnetic core 420 are joined together. Similarly, the front end face 410c-1 of the side portion 410c of the magnetic core 410 and the front end face 420c-1 of the side portion 420c of the magnetic core 420 are jointed together. As a result, the magnetic core 410 and the magnetic core 420 are joined together forming an annular magnetic core structure.

The structure of the transformer PT in FIG. 13C is slightly different with that in FIG. 13B. In FIG. 13B, the side face 411a of the plastic package body 411 and the side face 421a of the plastic package body 421 are jointed completely. In FIG. 13C, when the first chip package 401 and the second chip package 402 are mounted on the circuit board 200 side by side close to each other with but a gap 430 formed between the side face 411a of the plastic package body 411 and the side face 421a of the plastic package body 421. Similar with the structure in FIG. 13B, the side face 411a of the plastic package body 411 of the first chip package 401 and the side face 421a of the plastic package body 421 of the second chip package 402 are aligned and facing each other, thus the front end face 410a-1 of the side portion 410a of the magnetic core 410 and the front end face 420a-1 of the side portion 420a of the magnetic core 420 are aligned and facing each other, and the front end face 410c-1 of the side portion 410c of the magnetic core 410 and the front end face 420c-1 of the side portion 420c of the magnetic core 420 are aligned and facing each other. With the side portion 410a of the magnetic core 410 and the side portion 420a of the magnetic core 420 aligned with the gap existing there between and the side portion 410c of the magnetic core 410 and the side portion 420c of the magnetic core 420 aligned with the gap existing there between, the magnetic core 410 and the magnetic core 420 are jointed forming an annular magnetic core structure. In this embodiment, the side portions 410a and 410c of the magnetic core 410 and the side portions 420a and 420c of the magnetic core 420 are disconnected with an air gap formed in between for preventing magnetic saturation. Since the permeability of air is only a few thousandths of the permeability of an iron core for example, the average permeability of the magnetic core with the air gap decreases significantly, thus all the magnetic flux are nearly dropped with the magnetic core with the air gap. In this case, not only the residual magnetic flux density will be reduced, but also the maximum magnetic flux density may reach a saturation level, so that the magnetic flux increment is increased, and magnetic saturation will not occur to the magnetic core of the transformer. In this embodiment, an insulating material 450 is optionally filled in the gap 430 between the side face 411a of the plastic package body 411 and the side face 421a of the plastic package body 421. The insulating material 450 not only achieve the electrical isolation, but also can effectively enhance the bond strength of firmly adhering the first chip package 401 and the second chip package 402 on the circuit board 200.

The typical embodiments of specific structures of the detailed description are provided through the explanation and drawings above, and the foregoing invention proposes present preferred embodiments, but these contents are not intended to limit the invention. Various changes and amendments will be apparent for those skilled in the art after reading the explanation above. Therefore, the appended claims shall be deemed to cover all changes and amendments of the real intention and scope of the invention. Any equivalent range and content within the claims shall all fall within the intention and scope of the invention.

The invention claimed is:

1. A voltage converter comprising:
   a transformer comprising a primary winding and a secondary winding, wherein the primary winding and a master switch are connected in series between an input voltage and a ground terminal, and the secondary winding is connected between an output node for providing an output voltage to a load and a reference ground potential;

a first controller configured to produce a first pulse signal for driving the master switch to be turned on or turned off;

a second controller configured to compare a detection voltage representing the output voltage and/or a load current value with a first reference voltage, thus determining the logic state of a control signal generated thereof according to a comparison result signal, wherein the detection voltage is inputted at an inverting input terminal of a first comparator of the second controller while the first reference voltage is inputted at a non-inverting input terminal; further, when the detection voltage is lower than the first reference voltage, an RS trigger of the second controller is set by a high level comparison result signal of a first comparator, so that a control signal outputted by the RS trigger is turned from a low level to a high level; further, an on-time generator of the second controller starts timing from the moment that the control signal turns from the low level to the rising edge of the high level, and finishes timing when a preset on-time is ended; and further, when the timing is finished, a signal outputted by the on-time generator turns from the low level to the high level and resets the RS trigger, so that the control signal is turned from the high level to the low level; and a coupling element connected between the first and the second controllers for transferring the logic state of the control signal from the second controller to the first controller, so that the first controller determines the logic state of the first pulse signal according to the logic state of the control signal.

2. The voltage converter of claim 1, wherein a first switch and a second switch are connected in series between one bias circuit of the second controller and the reference ground potential, the first and second switches are mutually connected to a common node, the first switch is driven by the control signal while the second switch is driven by an inversion signal of the control signal; and a first capacitor of the coupling element is connected between a non-inverting input terminal of the second comparator in the first controller and the common node, while a second reference voltage is inputted to an inverting input terminal of the second comparator, a resistor is connected between the non-inverting input terminal of the second comparator and the ground terminal, and a second capacitor of the coupling element is connected between the ground terminal and the reference ground potential.

3. The voltage converter of claim 2, wherein the first switch is turned on while the second switch is turned off when the control signal is at the high level, the voltage provided by the bias circuit is applied at the common node, the voltage of the non-inverting input terminal of the second comparator is increased greater than the second reference voltage by the coupling element, and the second comparator outputs a high level first pulse signal; and the first switch is turned off while the second switch is turned on when the control signal is at the low level, the potential at the common node is clamped to the reference ground potential, the voltage of the non-inverting input terminal of the second comparator is reduced lower than the second reference voltage by the coupling element, and the second comparator outputs a low level first pulse signal.

4. The voltage converter of claim 1, wherein the coupling element is a pulse transformer, the control signal is transmitted to one end of the primary winding of the pulse transformer through one coupling capacitor in the second controller, and the other end of the primary winding is connected to the reference ground potential; and a coupling capacitor is connected between one signal generation node in the first controller and one end of the secondary winding of the pulse transformer, and the other end of the secondary winding is connected to the ground terminal, so that a first pulse signal keeping consistent with the logic state of the control signal is generated at the signal generation node.

5. The voltage converter of claim 4, wherein a resistor and a diode are arranged in parallel and are connected between the signal generation node and the ground terminal, and a cathode of the diode is connected to the signal generation node while an anode of the diode is connected to the ground terminal.

6. The voltage converter of claim 1, wherein an anode of one rectifier diode is connected to one end of the secondary winding of the transformer, a cathode of the rectifier diode is connected to the output node, and the other end of the secondary winding of the transformer is then directly connected to the reference ground potential.

7. The voltage converter of claim 1, wherein one end of the secondary winding of the transformer is directly connected to the output node, and a synchronous switch is connected between the other end of the secondary winding of the transformer and the reference ground potential, wherein:

the synchronous switch is driven by a second pulse signal which is an inversion signal mutually to the first pulse signal generated by the second controller, and the synchronous switch is turned off when the master switch is turned on, and the synchronous switch is turned on when the master switch is turned off; or the synchronous switch is driven by a second pulse signal generated by the second controller, and the synchronous switch is controlled to be turned off by the second pulse signal during a stage that the first pulse signal controls the master switch to be turned off.

8. The voltage converter of claim 7, wherein a sampling holder in the on-time generator samples and holds the voltage value at the end of the secondary winding of the transformer connected to the synchronous switch during a stage that the master switch is turned on but the synchronous switch is turned off, and a voltage-current converter of the on-time generator converts the sampled voltage value into a current to charge a charging capacitor in the on-time generator;

a third switch in the on-time generator and the charging capacitor are connected in parallel between a charging node and the ground terminal, the voltage at the charging node is inputted into a non-inverting input terminal of a third comparator in the on-time generator while a third reference voltage is inputted into an inverting input terminal of the third comparator; and a one-shot trigger of the second controller is triggered by the rising edge of the control signal to generate a high level clock signal, the clock signal is at a low level all the time but is at a high level at the moment of the rising edge of the control signal, so that the third switch is turned on by the clock signal at the moment of the rising edge of the control signal to discharge the charging capacitor transiently; and the charging capacitor starts timing a charging time interval after discharging transiently until the voltage of the charging node is greater than the third reference voltage, so that the comparison result signal of the third comparator is stopped when the level is turned from low to high; the high level comparison result signal of the third comparator triggers the RS trigger to restore, and the period timed is served as the preset on-time for turning on the master switch.

9. The voltage converter of claim 8, wherein
when the input voltage increases causing the increase of the sampled voltage value therewith, the preset on-time is decreased; or
when the input voltage decreases causing the decrease of the sampled voltage value therewith, the preset on-time is increased.

10. The voltage converter of claim 1, wherein
a third switch in the on-time generator and the charging capacitor are connected in parallel between a charging node and the ground terminal, the voltage at the charging node is inputted into a non-inverting input terminal of a third comparator in the on-time generator and a third reference voltage is inputted into an inverting input terminal;
the on-time generator comprises a current source and a plurality of additional current sources for charging the charging capacitor, and an electronic switch is connected between the output terminal of each additional current source and the charging node;
a one-shot trigger of the second controller is triggered by the rising edge of the control signal to generate a high level clock signal, the clock signal is at a low level all the time but is at a high level at the moment of the rising edge of the control signal, so that the third switch is turned on by the clock signal at the rising edge of the control signal to discharge the charging capacitor transiently; and
the charging capacitor starts timing a charging time interval after discharging transiently until the voltage of the charging node is greater than the third reference voltage, so that the comparison result signal of the third comparator is stopped when the comparison result signal is turned from low level to high level, the high level comparison result of the third comparator triggers the RS trigger to restore, and the charging time interval is served as the preset on-time for turning on the master switch.

11. The voltage converter of claim 10, wherein
when the detection voltage is fluctuated, the detection voltage is set to be lower than the first reference voltage at the initial moment of a preset time interval, and the detection voltage is modulated to be greater than the first reference voltage at the end of the preset time interval after one or more on-off periods of the master switch are driven by the first pulse signal;
the respective frequency values of one or more clock signals in the preset time interval are compared with an upper frequency critical value and a lower frequency critical value respectively by one frequency comparator of the on-time generator in sequence; when any frequency value is greater than the upper frequency critical value, a binary initial count value set on one counter of the on-time generator is subtracted by 1, or when any frequency value is less than the lower frequency critical value, the initial count value of the counter is added by 1; and after all the frequency values are completely compared, a total count value is calculated by a counter; and
when the total count value is greater than an upper critical count value set on the counter, the total count value is defined to be equal to the upper critical count value, or when the total count value is less than a lower critical count value set on the counter, the total count value is defined to be equal to the lower critical count value, and each code element characterizing high level or low level in the binary total count value is accordingly used for turning on or turning off one electronic switch.

12. The voltage converter of claim 11, wherein
in any two adjacent preset time intervals, the total count value in a first preset time interval is greater than the initial count value, and a number of times of the electronic switch turned on in a second preset time interval is more than quantity number of times the electronic switch turned on in the first preset time interval, then the preset on-time in the second preset time interval is shorter than the preset on-time in the first preset time interval; or
the total count value in the first preset time interval is less than the initial count value, and a number of times of the electronic switch turned on in a second preset time interval is less than a number of times of the electronic switch turned on in the first preset time interval, then the preset on-time in the second preset time interval is longer than the preset on-time in the first preset time interval; or
the total count value in the first preset time interval is equal to the initial count value, and a number of times of the electronic switch turned on in the second preset time interval and a number of times of the electronic switch turned on in the first preset time interval are equal, then the preset on-time in the second preset time interval is equal to the preset on time on time in the first preset time interval.

13. A voltage converter comprising:
a transformer comprising a primary winding and a secondary winding, wherein the primary winding and a master switch are connected in series between an input voltage and a ground terminal, and the secondary winding is connected between an output node for providing an output voltage to a load and a reference ground potential, wherein the transformer further comprises an auxiliary winding having the same winding direction as the secondary winding, a diode is connected between one end of the auxiliary winding and one end of an auxiliary capacitor, the other ends of the auxiliary winding and the auxiliary capacitor are connected to the ground terminal; when a current passes through the secondary winding, the diode between the secondary winding and the auxiliary capacitor is positively turned on and a current flowing through the auxiliary winding charges the auxiliary capacitor, and the auxiliary capacitor provides a power supply voltage to the first controller;
a first controller configured to produce a first pulse signal for driving the master switch to be turned on or turned off;
a second controller configured to compare a detection voltage representing the output voltage and/or a load current value with a first reference voltage, thus determining the logic state of a control signal generated thereof according to a comparison result signal; and a coupling element connected between the first and the second controllers for transferring the logic state of the control signal from the second controller to the first controller, so that the first controller determines the logic state of the first pulse signal according to the logic state of the control signal.

14. The voltage converter of claim 13, wherein an electrifying starting module in the first controller comprises a junction field effect transistor and a control switch, the control switch is connected between the control end and the ground terminal of the junction field effect transistor, and the control switch is turned on when the voltage of the auxiliary capacitor does not meet the standard of a starting voltage, and is turned off when the voltage of the auxiliary capacitor meets the standard of the starting voltage; and when the voltage converter is accessed to the electrifying period of an alternating current voltage, the alternating current voltage is rectified by a rectifier circuit and then is subsequently input to the drain of the junction field effect transistor, so that the current flowing out from the source electrode of the junction field effect transistor charges the auxiliary capacitor through one diode until the voltage of the auxiliary capacitor meets the standard of the starting voltage completing an electrifying starting procedure, and after the electrifying starting procedure is completed, the control switch is turned off, and the auxiliary capacitor is charged by the auxiliary winding when the auxiliary winding is turned on.

15. A voltage converter comprising:

a transformer comprising a primary winding and a secondary winding, wherein the primary winding and a master switch are connected in series between an input voltage and a ground terminal, and the secondary winding is connected between an output node for providing an output voltage to a load and a reference ground potential;

a first controller configured to produce a first pulse signal for driving the master switch to be turned on or turned off;

a second controller configured to compare a detection voltage representing the output voltage and/or a load current value with a first reference voltage, thus determining the logic state of a control signal generated thereof according to a comparison result signal;

a coupling element connected between the first and the second controllers for transferring the logic state of the control signal from the second controller to the first controller, so that the first controller determines the logic state of the first pulse signal according to the logic state of the control signal;

a voltage divider that captures one voltage division value the output voltage at the output node and a sensing resistor, wherein the sensing resistor is serially connected with the load between the output node and the reference ground potential, and the voltage drop at two ends of the sensing resistor is taken as the sensing voltage which represents the value of the load current;

a filter, wherein the filter is used for filtering off a direct current component in the feedback voltage but maintaining the voltage of an alternating current component;

an adder; and an amplifier, wherein the amplifier is used for amplifying the sensing voltage, and the voltage of the alternating current component outputted by the filter and an amplification voltage of the sensing voltage outputted by the amplifier are combined in the adder and then used as the detection voltage.

* * * * *